US011409509B2

(12) United States Patent
Yoon

(10) Patent No.: US 11,409,509 B2
(45) Date of Patent: Aug. 9, 2022

(54) APPARATUS AND METHOD FOR CONTROLLING INTERNET OF THINGS DEVICES

(71) Applicant: Samsung Electronics Co., Ltd., Gyeonggi-do (KR)

(72) Inventor: Seokhyun Yoon, Gyeonggi-do (KR)

(73) Assignee: Samsung Electronics Co., Ltd

(*) Notice: Subject to any disclaimer, the term of this patent is extended or adjusted under 35 U.S.C. 154(b) by 667 days.

(21) Appl. No.: 16/368,185

(22) Filed: Mar. 28, 2019

(65) Prior Publication Data

US 2019/0220264 A1  Jul. 18, 2019

Related U.S. Application Data

(63) Continuation of application No. 14/724,174, filed on May 28, 2015, now Pat. No. 10,248,399.

(Continued)

(51) Int. Cl.
*G06F 8/61* (2018.01)
*H04L 69/18* (2022.01)
(Continued)

(52) U.S. Cl.
CPC ............. *G06F 8/61* (2013.01); *H04L 12/282* (2013.01); *H04L 12/2832* (2013.01);
(Continued)

(58) Field of Classification Search
CPC ..... G06F 8/61; H04L 12/282; H04L 12/2832; H04L 41/0833; H04L 67/125;
(Continued)

(56) References Cited

U.S. PATENT DOCUMENTS 8,374,825 B2  2/2013 Vock et al.
8,401,681 B2  3/2013 Rosenblatt et al.
(Continued)

FOREIGN PATENT DOCUMENTS

CN  102662675  9/2012
CN  103038652  4/2013
(Continued)

OTHER PUBLICATIONS

Chinese Office Action dated Mar. 30, 2021 issued in counterpart application No. 201910977197.7, 15 pages.
(Continued)

*Primary Examiner* — Thien M Le
*Assistant Examiner* — Tae W Kim
(74) *Attorney, Agent, or Firm* — The Farrell Law Firm, P.C.

(57) ABSTRACT

An electronic device including a memory is disclosed. The memory stores instructions controlling the electronic device to acquire information on a first external electronic device, access a server storing a software program related to the first external electronic device, receive at least a portion of the software program related to the first external electronic device from the server through the communication interface, install the at least a portion of the software program, transmit the at least a portion of the information on the first external electronic device and/or at least one part of the received at least a portion of the software program to a second external electronic device, and provide a user interface to the display using the installed at least a portion of the software program. The user interface is used for the second external electronic device to perform an operation related to the first external electronic device.

25 Claims, 30 Drawing Sheets

Related U.S. Application Data

(60) Provisional application No. 62/003,947, filed on May 28, 2014.

(51) Int. Cl.

| | | |
|---|---|---|
| *H04W 4/60* | (2018.01) | |
| *H04L 67/00* | (2022.01) | |
| *H04L 67/125* | (2022.01) | |
| *H04L 12/28* | (2006.01) | |
| *H04L 41/0833* | (2022.01) | |

(52) U.S. Cl.
CPC ........ *H04L 41/0833* (2013.01); *H04L 67/125* (2013.01); *H04L 67/34* (2013.01); *H04L 69/18* (2013.01); *H04W 4/60* (2018.02); *H04L 2012/285* (2013.01); *H04L 2012/2841* (2013.01)

(58) Field of Classification Search
CPC . H04L 67/34; H04L 69/18; H04L 2012/2841; H04L 2012/285; H04W 4/60
USPC ........................................................ 235/375
See application file for complete search history.

(56) References Cited

U.S. PATENT DOCUMENTS

| | | | |
|---|---|---|---|
| 8,577,392 | B1 | 11/2013 | Pai et al. |
| 9,739,618 | B2 * | 8/2017 | Eich ......................... H04L 67/12 |
| 2002/0193145 | A1 | 12/2002 | Latvakoski |
| 2003/0080116 | A1 | 5/2003 | Williamson |
| 2006/0168178 | A1 | 7/2006 | Hwang |
| 2011/0010704 | A1 | 1/2011 | Jeon et al. |
| 2012/0109384 | A1 | 5/2012 | Stepanian |
| 2012/0220282 | A1 | 8/2012 | Kwon et al. |
| 2013/0086245 | A1 * | 4/2013 | Lu ......................... G06F 1/3212 709/223 |
| 2013/0305322 | A1 | 11/2013 | Raleigh et al. |
| 2014/0047487 | A1 | 2/2014 | Guedalia |
| 2014/0244001 | A1 * | 8/2014 | Glickfield ............... H04L 67/16 700/33 |
| 2015/0201022 | A1 * | 7/2015 | Kim ...................... G06F 9/5061 709/203 |

FOREIGN PATENT DOCUMENTS

| | | |
|---|---|---|
| CN | 103076883 | 5/2013 |
| CN | 202948298 | 5/2013 |
| CN | 202995447 | 6/2013 |
| CN | 103237058 | 8/2013 |
| JP | 2009-282896 | 12/2009 |
| JP | 2013-239096 | 11/2013 |
| KR | 10-2011-0004650 | 1/2011 |
| KR | 10-2013-0099769 | 2/2012 |
| KR | 10-2012-0097008 | 9/2012 |
| KR | 10-2012-0115864 | 3/2013 |
| KR | 10-2013-0038757 | 4/2013 |
| KR | 10-2014-0008667 | 5/2014 |
| KR | 10-2013-0086714 | 9/2014 |

OTHER PUBLICATIONS

Korean Office Action dated Apr. 30, 2021 issued in counterpart application No. 10-2014-0166616, 23 pages.
European Search Report dated Feb. 28, 2017 issued in counterpart application No. 15169638.2-1862, 4 pages.
International Search Report dated Sep. 9, 2015 issued in counterpart application No. PCT/KR2015/005362, 12 pages.
European Search Report dated Oct. 28, 2015 issued in counterpart application No. 15169638.2-1862, 9 pages.
Apple TV (3rd Generation, Early 2013) Specs (3rd Gen, MD199LL/A, AppleTV3.2, A1469, 2633), May 28, 2015 @Everymac.com.
Apple TV 3rd Generation Teardown—iFixit.com (https://www.ifixit.com/Teardown/Apple+TV+3rd+Generation+Teardown/8293), May 28, 2015.
Cling Core User Manual (http://4thline.org/projects/cling/core/manual/cling-core-manual.html#chapter.Android), Apr. 1, 2015.
Intel Software for UPnP Technology Download Tools Intel Developer Zone (http://software.intel.com/en-us/articles/intel-software-for-upnp-technology-download-tools/), Apr. 1, 2015.
Internet of Things Software Guide Postcapes (http://postscapes.com/internet-of-things-software-guide), May 28, 2015.
Internet of Things (http://en.wikipedia.org/wiki/Internet_of_Things), Apr. 1, 2015.
Pages from the app, the bridge (http://www2.meethue.com/en-us/what-is-hue/the-system/), Apr. 15, 2015.
Philips' smart lighting tells you where to go in the grocery store(Feb. 17, 2014) (http://www.engadget.com/2014/02/17/philips-intelligent-lighting-for-stores/), Apr. 1, 2015.
Securing the Internet of Things (http://www.ecnmag.com/articles/2014/03/securing-internet-things), May 28, 2015.
Antonio J. Jara et al. An architecture based on Internet of Things to support mobility & security in medical environments, IEEE Comm. Soc. CCNC 2010 proceedings, Jan. 2010.
Hue_introduction(http://www2.meethue.com/en-us/), Apr. 15, 2015.
The Internet of Things Connecting Objects (http://books.google.co.kr/books?hl=en&lr=&id=gVs84nHGVLoC&oi=fnd&pg=PP1&dq=%22internet+of+things%22+%22user+interface%22+&ots=MqHPnoNmtb&sig=6PyW7ICb7-WpkXiv6MaTSMicQlw&redir_esc=y#v=onepage&q=%22internet%20of%20things%22%20%22user%20interface%22&f=false), Feb. 4, 2013.
Universal Plug and Play (http://en.wikipedia.org/wiki/Universal_Plug_and_Play#Other_components), Apr. 1, 2015.
ZigBee (http://en.wikipedia.org/wiki/ZigBee), Apr. 1, 2015.
Matthias Kranz et al., Embedded Interaction, Interacting with the Internet of Things. IEEE Computer Society, Internet of Things Track, Mar. 11, 2010.
Yuxi Liu et al., Key Technologies and Applications of Internet of Things, 2012 Fifth International Conference on Intelligent Computation Technology and Automation, Institute of Computer Science and Information Engineering, Harbin Normal University, Heilongjiang, Harbin 150025, China zp-0431@163.Com. 2012, Jan. 12-14, 2012.
Francis da Costa Rethinking the Internet of Things A Scalable Approach to Connecting Everything(May 10, 2014). Xpress Open, Dec. 30, 2013.
Chinese Office Action dated Jan. 31, 2019 issued in counterpart application No. 201580028156.3, 5 pages.
KR Notice of Patent Grant dated Oct. 22, 2021 issued in counterpart application No. 10-2014-0166616, 3 pages.

* cited by examiner

APPARATUS AND METHOD FOR CONTROLLING INTERNET OF THINGS DEVICES

CROSS REFERENCE TO RELATED APPLICATION

This application is a Continuation Application of U.S. patent application Ser. No. 14/724,174, which was filed in the U.S. Patent and Trademark Office on May 28, 2015, and claims priority under 35 U.S.C. § 119(e) to U.S. Provisional Patent Application No. 62/003,947, which was filed in the United States Patent and Trademark Office on May 28, 2014, and under 35 U.S.C. § 119(a) to Korean Patent Application Serial No. 10-2014-0166616, which was filed in the Korean Intellectual Property Office on Nov. 26, 2014, the contents of each of which are incorporated herein by reference.

TECHNICAL FIELD

The present disclosure relates generally to an electronic device, and more particularly, to an apparatus and method for controlling Internet of Things (IoT) devices.

BACKGROUND

By connecting many computing devices such as servers, Personal Computers (PCs), mobile devices, etc., to one another, the Internet made possible the exchange of information between the devices. Currently, attempts are being made to connect things generally having no computing function, for example, sensors, home appliances, meters, etc., to the Internet, to exchange various information or data therebetween. The mechanism of connecting the things via the Internet is commonly referred to as the Internet of Things (IoT).

In the IoT space, a great deal of research and development is being made to provide a protocol for communication between various devices, communication mechanism between the devices, and collection of data. The IoT is expected to contribute to technology growth through the Internet by being combined with various technologies.

SUMMARY

In the implementation of the IoT, various kinds of things or electronic devices can be connected to the Internet. However, due to the diverse functionalities, levels of computing power, and communication capabilities of such things, there can be difficulties in connecting such devices to the Internet, which may affect the product development and usability of such devices. Thus, there is a need for addressing such problems and/or disadvantages described above.

One embodiment of the present disclosure may provide a scheme and systematic approach for solving the above problems. Other embodiments of the present disclosure may provide identification and discovery, lightweight network protocol, and/or IoT middleware framework, for low-end IoT devices having restrictive resources for accessing the Internet. According to one embodiment of the present disclosure, a system includes a mobile device including a first wireless communication interface, a camera, a display, a first non-volatile memory, and a first processor electrically connected to the first wireless communication interface, the camera, the display, and the first non-volatile memory, and a media device including, a second wireless communication interface configured to support a Bluetooth® protocol, a third wireless communication interface configured to support a wireless fidelity (Wi-Fi) protocol, a second non-volatile memory, a wired communication port configured to transmit audio/video (A/V) data to a television, a power connector configured to receive power supply, and a second processor electrically connected to the second wireless communication interface, the third wireless communication interface, the non-volatile second memory, the wired communication port, and the power connector, wherein the first non-volatile memory stores instructions that, when executed, cause the mobile device to capture an image of a quick response (QR) code associated with an Internet-of-Things (IoT) device using the camera, obtain information from the image of the QR code, receive software codes corresponding to the obtained information from a server through the first wireless communication interface, transmit at least a portion of the received software codes to the media device, provide, on the display, a user interface using the at least a portion of the software codes, the user interface being configured control the IoT device, receive a user input through the user interface provided on the display, and based on the user input, transmit a control signal to the media device, the control signal being used by the media device for remotely controlling the IoT device.

According to another embodiment, a mobile device includes a wireless communication interface, a camera, a display, a processor, and a memory storing instructions that, when executed by the processor, cause the mobile device to capture an image of a QR code associated with an IoT device using the camera, obtain information from the image of the QR code, receive software codes corresponding to the obtained information from a server through the wireless communication interface, provide, on the display, a user interface using an at least a portion of the software codes, the user interface being configured to control the IoT device, receive a user input through the user interface provided on the display, and based on the user input, transmit a control signal to an external device, the control signal being used by the external device for remotely controlling the IoT device.

According to another embodiment, a system includes a mobile device including a first wireless communication interface, a camera, a touchscreen display, a first non-volatile memory, and a first processor electrically connected to the first wireless communication interface, the camera, the display, and the first non-volatile memory, and a media device including a second wireless communication interface configured to support a Bluetooth® protocol, a third wireless communication interface configured to support a Wi-Fi protocol, a second non-volatile memory, a wired communication port configured to transmit A/V data to a television, a power connector configured to receive power supply, and a second processor electrically connected to the second wireless communication interface, the third wireless communication interface, the second non-volatile memory, the wired communication port, and the power connector, wherein the first non-volatile memory stores instructions that, when executed, cause the first processor to scan a QR code associated with an IoT device, using the camera, access, through the first wireless communication interface, a server that stores a software program related to the IoT device, based on the scanned QR code, receive at least a portion of the software program from the server, through the first wireless communication interface, store, on the first non-volatile memory, the at least a portion of the software program received from the server, provide an image and text on the display, using the at least a portion of the software program, receive a user input through the display, and transmit a signal requesting to control the IoT device via the Internet to the media device, based on the user input, and wherein the second non-volatile memory stores control software for controlling a plurality of different IoT devices, and instructions that, when executed, cause the second processor to independently of transmission of the A/V data via the wired communication port, and in response to the signal requesting to control the IoT device via the third wireless communication interface, generate a signal for controlling the IoT device, using the control software, and transmit, to the IoT device, the signal for controlling the IoT device.

According to another embodiment, a system includes a mobile device including a first wireless communication interface, a camera, a touchscreen display, a microphone, a first non-volatile memory, and a first processor electrically connected to the first wireless communication interface, the camera, the display, the microphone, and the first non-volatile memory, and a media device connected to a personal cloud, and configured to be connected to a television and to use the television as a media device user interface, wherein the media device includes a second wireless communication interface configured to support a Bluetooth® protocol, a third wireless communication interface configured to support a Wi-Fi protocol, a second non-volatile memory, a wired communication port configured to transmit A/V data to the television, a power connector configured to receive power supply; and a second processor electrically connected to the second wireless communication interface, the third wireless communication interface, the second non-volatile memory, the wired communication port, and the power connector, wherein the first non-volatile memory stores instructions that, when executed, cause the first processor to scan a QR code on an IoT device or provided along with the IoT device, using the camera, access, through the first wireless communication interface, a server that stores a software program related to the IoT device, based on the scanned QR code, receive at least a portion of the software program from the server, through the first wireless communication interface, store, on the first non-volatile memory, the at least a portion of the software program received from the server, display an icon of an application program dedicated for controlling a plurality of IoT devices on the display, receive an input for selecting the icon, display a user interface including a list of IoT devices controllable by the mobile device on the display, wherein the list includes at least one image, and/or at least one text, using the stored at least a portion of the software program, receive a user input through the display, and transmit a signal requesting to control the IoT device via the Internet to the media device, based on the user input, wherein the second non-volatile memory stores control software for controlling a plurality of different IoT devices, and instructions that, when executed, cause the second processor to receive information associated with the IoT device, independently of transmission of the A/V data via the wired communication port, and in response to the signal requesting to control the IoT device via the third wireless communication interface, generate a signal for controlling the IoT device, using the control software, and transmit, to the IoT device, the signal for controlling the IoT device, using the Bluetooth® protocol or the Wi-Fi protocol.

BRIEF DESCRIPTION OF THE DRAWINGS

The above and other aspects, features, and advantages of certain embodiments of the present disclosure will become more apparent from the following detailed description when taken in conjunction with the accompanying drawings, in which.

DETAILED DESCRIPTION

Figure 1:
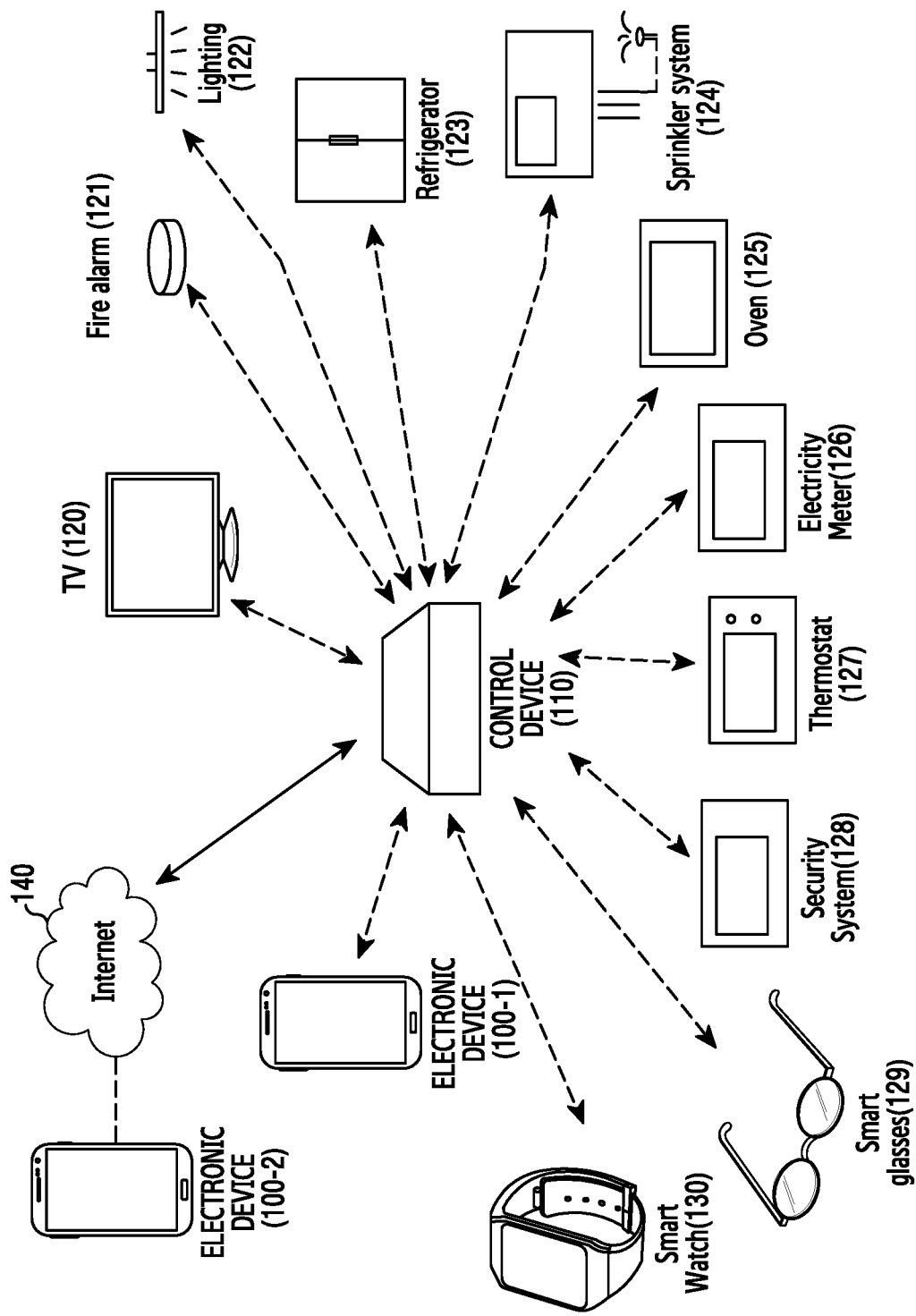
FIG. 1 illustrates a system including various things or IoT devices connected to the Internet, according to one embodiment of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B," "at least one of A or/and B," or "one or more of A or/and B" used in the various embodiments of the present disclosure include any and all combinations of words enumerated with it. For example, "A or B," "at least one of A and B," or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for," "having the capacity to," "designed to," "adapted to," "made to," or "capable of" according to the situation. The term "configured to (set to)" does not necessarily mean "specifically designed to" as hardware. Instead, the expression "apparatus configured to . . . " may mean that the apparatus is "capable of . . . " along with other devices or parts in a certain situation. For example, "a processor configured to (set to) perform A, B, and C" may be a dedicated processor, for example, an embedded processor, for performing a corresponding operation, or a generic-purpose processor, for example, a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well, unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

A term "module" used in the present document may imply a unit including, for example, one of hardware, software, and firmware or a combination of two or more of them. The "module" may be interchangeably used with a term such as a unit, a logic, a logical block, a component, a circuit, and the like. The "module" may be a minimum unit of an integrally constituted component or may be a part thereof. The "module" may be a minimum unit for performing one or more functions or may be a part thereof. The "module" may be mechanically or electrically implemented. For example, the "module" of the present disclosure may include at least one of an Application-Specific Integrated Circuit (ASIC) chip, a Field-Programmable Gate Arrays (FPGAs), and a programmable-logic device, which are known or will be developed and which perform certain operations.

At least some portion of a device (e.g., modules or functions thereof) or method (e.g., operations) according to various embodiments of the present disclosure may be implemented with, for example, instructions stored in a computer-readable storage media. If such instructions are executed by one or more processors, the one or more processors may perform a function corresponding to the instruction. The computer-readable storage media may be, for example, a memory.

The computer-readable storage media may include, for example, a hard disk, a magnetic medium (for example, a floppy disc and a magnetic tape), an optical storage medium (for example, a Compact Disc-Read Only Memory (CD-ROM) or a DVD), a magneto-optic medium such as a floptical disc, a hardware device (for example, a ROM, a Random Access Memory (RAM), a flash memory), and the like. Examples of program instructions include not only a machine language created by a compiler, but also a high-level language executable by a computer by using an interpreter or the like. The aforementioned hardware device may be configured to operate as one or more software modules to perform the operation of the embodiments described below, and the other way around is also possible.

The module or programming module according to various embodiments of the present disclosure may further include at least one or more of the aforementioned elements, or may omit some of them, or may further include additional other elements. Operations performed by a module, programming module, or other elements according to embodiments of the present disclosure may be executed in a sequential, parallel, repetitive, or heuristic manner. In addition, some of the operations may be executed in a different order or may be omitted, or other operations may be added.

An electronic device according to embodiments may include, for example, at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., smart glasses, a head-mounted-device (HMD), electronic clothing, an electronic bracelet, an electronic necklace, an electronic appcessory, an electronic tattoo, a smart mirror, or a smart watch) or at least one of the functionalities thereof.

In other embodiments, an electronic device may be a smart home appliance. Such appliances may include at least one of: a television (TV); a digital video disk (DVD) player; an audio player; a refrigerator; an air conditioner; a vacuum cleaner; an oven; a microwave oven; a washing machine; an air cleaner; a set-top box; a home automation control panel; a security control panel; a TV box (e.g., Samsung Home-Sync®, Apple TV®, or Google TV); a game console (e.g., Xbox® or Play Station®) an electronic dictionary; an electronic key; a camcorder; or an electronic frame or at least one of the functionalities thereof.

In other embodiments, an electronic device may include at least one of: medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MM) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a light bulb, various sensors, an electricity meter, a gas meter, a sprinkler, a fire alarm, a thermostat, a streetlamp, a toaster, a sporting equipment, a water heater, a heater, or a boiler and the like) or at least one of the functionalities thereof.

In certain embodiments, an electronic device may include at least one of: a piece of furniture or a building/structure; an electronic board; an electronic signature receiving device; a digital signage device, a projector; and various measuring instruments (e.g., a water meter, an electricity meter, a gas meter, or a wave meter) or at least one of the functionalities thereof.

An electronic device according to various embodiments of the present disclosure may also include a combination of two or more of the above-mentioned devices. In certain embodiments, the electronic device can be a flexible electronic device. Further, it will be apparent to those skilled in the art that an electronic device according to various embodiments of the present disclosure is not limited to the above-mentioned devices, and can have a new type of device. In this document, the term "user" may indicate a person who uses an electronic device or a device (e.g., an artificial intelligence electronic device) that uses the electronic device.

Overview of an IoT System

Various embodiments for implementation of the IoT are described below. FIG. 1 illustrates a system including various things or IoT devices connected to the Internet, according to one embodiment.

Referring to FIG. 1, the illustrated system may include a control device 110 connected to the Internet 140, various IoT devices 120 to 130 connected to the control device 110, a first electronic device 100-1 connected to the control device 110 via short-range communication and providing a user interface, and a second electronic device 100-2 remotely connected to the control device 110 through the Internet 140. The first electronic device 100-1 may be the same as the second electronic device 100-2.

In one embodiment, the control device 110 may be a stand-alone device. In another embodiment, the control device 110 may include at least one of a home networking controller, a set-top box, a media device (for example, Samsung Home Sync Google TV®, Apple TV®), a game console (for example, Microsoft XBOX®, Sony Play Station®), a network access point, a security control panel, or a home climate controller, or any combination thereof.

The control device 110 may be wired to and/or wirelessly connected to various external electronic devices (for example, the IoT devices 120 to 130), using various communication schemes. For example, the communication schemes may include at least one of Wireless Fidelity (WiFi), Bluetooth (BT), Bluetooth Low Energy (BLE), Zigbee, power line communication, Infrared transmission (IR), and ultrasound communication.

In one embodiment, the control device 110 may be connected to the IoT devices 120 to 130, and perform a function of controlling the IoT devices 120 to 130, and communicating data with the IoT devices 120 to 130. In other embodiments, the control device 110 may serve as a gateway that collects data from the IoT devices 120 to 130 and forwards the collected data to other devices (for example, a server or other gateway devices) on an external network through the Internet 140.

In other embodiments, the control device 110 may be connected to at least one cloud. For example, the cloud may collect data from the control device 110 and other devices similar to the control device 110. The cloud may form big date using the collected data. The collected data may be used for a specific purpose (for example, advertisement). In certain embodiments, the control device 110 may be connected to a personal cloud (for example, DropBox®, iCloud®, SugarSync®, SkyDrive®, OneDrive®, GoogleDrive®, and the like).

In the illustrated embodiment, the IoT devices 120 to 130 may include at least one of a home device (e.g., a TV 120, a refrigerator 123, an oven 125, a washer, a dryer, and the like), a lighting system 122, a fire alarm system 121, a meter (e.g., an electricity meter 126, a gas meter and the like), a solar power system, a sprinkler system 124, a thermostat 127, or a security system 128. In other embodiments, various other IoT devices may also or alternatively be connected to the control device 110.

Further, the electronic devices 100-1 and 100-2 (for example, a smart phone or a tablet computing device) and/or optionally a wearable device (for example, the smart glasses 129 or the smart watch 130) may serve to function as a user interface of the control device 110. For example, the electronic device 100-1 or 100-2 may control the various IoT devices 120 to 130 through the control device 110.

In one embodiment, the electronic device 100-1 may be directly or indirectly connected to the control device 110 using a short-range communication scheme (e.g., WiFi, Bluetooth, BLE, Zigbee, IR, ultrasound communication, etc.). In another embodiment, the electronic device 100-2 may be connected to the control device 110 through the Internet network (e.g., Internet 140) or a cellular network.

The electronic device 100-1 may use a different communication scheme, depending on the location thereof. For example, when located close to the control device 110, the electronic device 100-1 may use short-range communication to communicate with the control device 100 while the electronic device 100-1 may use the Internet network or cellular network to communicate with the control device 110 when located away from the control device 110. In other embodiments, the control device 110 may be connected, e.g., via wire, to the TV 120, and use the TV 120 as a user interface.

In certain embodiments, the IoT devices 120 to 130 illustrated in FIG. 1 or other IoT devices may have various computing abilities and/or communication abilities. For example, the IoT devices may have a variety of performance capabilities as classified in Table 1 below.

TABLE 1

| class | capability level | IP protocol | HW | protocol | examples |
|---|---|---|---|---|---|
| 1 | Highest | IPv6 and conventional | TX, RX | two or more of cellular, WiFi, BT, BLE, Zigbee, NFC, etc. | Mobile device |
| 2 | Second highest | IPv6 or conventional | TX, RX | two or more of near-distance (WiFi, BT, BLE, Zigbee, NFC, etc.) and no cellular | security panel (with landline), Homesync ®, set-top box |
| 3 | Modest | IPv6 or conventional | TX, RX | one of near-distance (WiFi, BT, BLE, Zigbee, NFC, etc.) | TV, refrigerator, |
| 4 | Conventional | conventional | TX, RX | one of near-distance (WiFi, BT, BLE, Zigbee, NFC, etc.) | |
| 5 | Basic | No IP protocol | TX, RX | one of near-distance (WiFi, BT, BLE, Zigbee, NFC, etc.) or wire, or power line (IEEE1901) | Thermostat, washer/dryer, Light bulb socket (outside), Gas valve, Sprinkler, Ventilation |
| 6 | Limited | No IP protocol | RX only | One of near-distance, power line, or IR, etc. | Light bulb socket (inside) |
| 7 | Very limited | No IP protocol | TX only | One of near-distance, power line, IR, acoustic, ultrasound, etc. | smoke alarm, fire alarm, Electric meter, Water valve (leakage), Water tank (leakage), Heater (malfunction) |

Figure 2A:
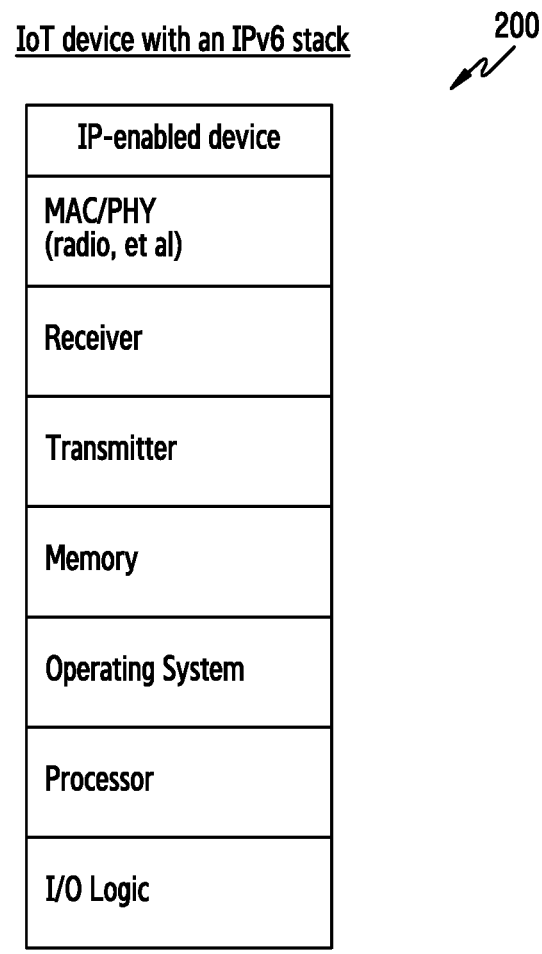
FIG. 2A is a schematic diagram of an IoT device connectable to the Internet, according to an embodiment of the present disclosure.
Figure 2B:
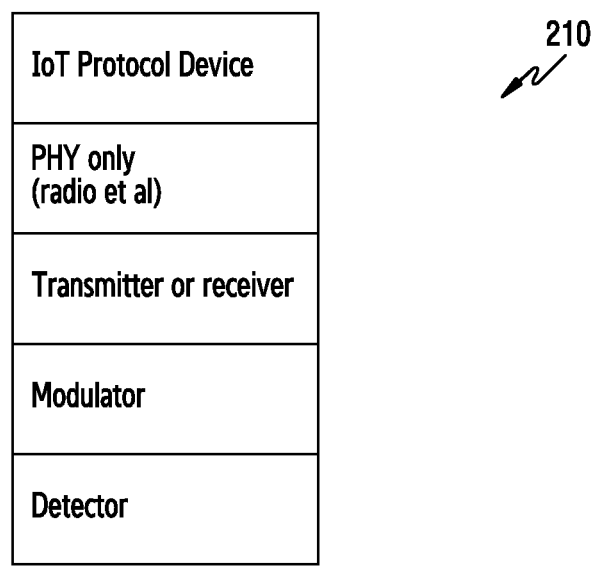
FIG. 2B is a schematic diagram of an IoT device connectable to the Internet, according to another embodiment of the present disclosure.

As shown in Table 1 above, the IoT devices 120 to 130 may use control signals according to one or more of different protocols, based on their respective classes. For example, an IP-enabled IoT device (for example, the TV 120, the refrigerator 123, the security system 128, etc.) of class 4 ("conventional") or higher (i.e., Classes 1-4) includes computing ability and communication means that can support the Internet Protocol version 6 (IPv6) protocol. In one embodiment, as illustrated in FIG. 2A, the IoT device 200 may include at least one of a media access control/physical (MAC/PHY) layer (e.g., radio), a receiver, a transmitter, a memory, an operating system (OS), a processor, or an Input/Output (I/O) logic, and thereby can support the IPv6 protocol.

In another embodiment, an IoT device (for example, the oven 125, a washer, a dryer, the fire alarm system 121, a meter (e.g., the electricity meter 126, the gas meter, and the like), the sprinkler system 124, the thermostat 127, etc.) of the class grade 5 ("basic") or lower (i.e., Classes 5-7) of the Table 1, can have only limited computing powers and simple communication means and thus may not be capable of supporting the IPv6 protocol. Such IoT devices, for example, the IoT device 210, may include only at least one of a PHY layer (e.g., radio), a receiver, a transmitter, a modulator, or a detector. Due to its limited resources and communication capabilities, such IoT devices (for example, the IoT device 210) may not support the IPv6 protocol.

In one embodiment, the control device 110 may perform uni-directional communication with a low-power or low-end IoT device (e.g., the fire alarm system 121). For example, the control device 110 may receive a control signal from the low-power IoT device, using a BLE communication protocol.

In another embodiment, the control device 110 may perform bi-directional communication with a high-power and high-end IoT device (e.g., home appliances). For example, the control device 110 may transmit and receive signals to and from the high-end IoT device using a WiFi communication protocol.

In yet another embodiment, the control device 110 may be connected to the IoT devices using at least two or more different wireless communication schemes, based on different characteristics, e.g., power consumption, communication ranges, etc., of the IoT devices 120 to 130. For example, when connected to a plurality of IoT devices, the control device 110 may be connected to the IoT device using different wireless communication schemes, based on power consumption (e.g., battery levels), and/or communication ranges of the respective IoT devices.

In yet another embodiment, the control device 110 may transmit and receive data with a plurality of IoT devices on a time-division basis. For example, when connected to a plurality of IoT devices, the control device 110 may transmit and receive data with the respective IoT devices using different time durations or intervals.

As described above, the control device 110 may be configured to, at a low cost, effectively control the IoT devices 120 to 130 that have different configurations and use different communication protocols. In addition, the control device 110 may be located close to the IoT devices, regardless of a location of a user. Thus, the control device 110 can collect data from the IoT devices continuously, continually at a selected interval, or during selected periods, and can control the IoT devices when needed.

Furthermore, in the illustrated embodiment, a user interface of the control device 110 may be provided by other devices (for example, the electronic devices 100-1 and 100-2, the smart watch 130, or the TV 120) for the user's convenience. However, in other embodiments, a user interface may be integrated with the control device 110.

IoT Control Device

Figure 3:
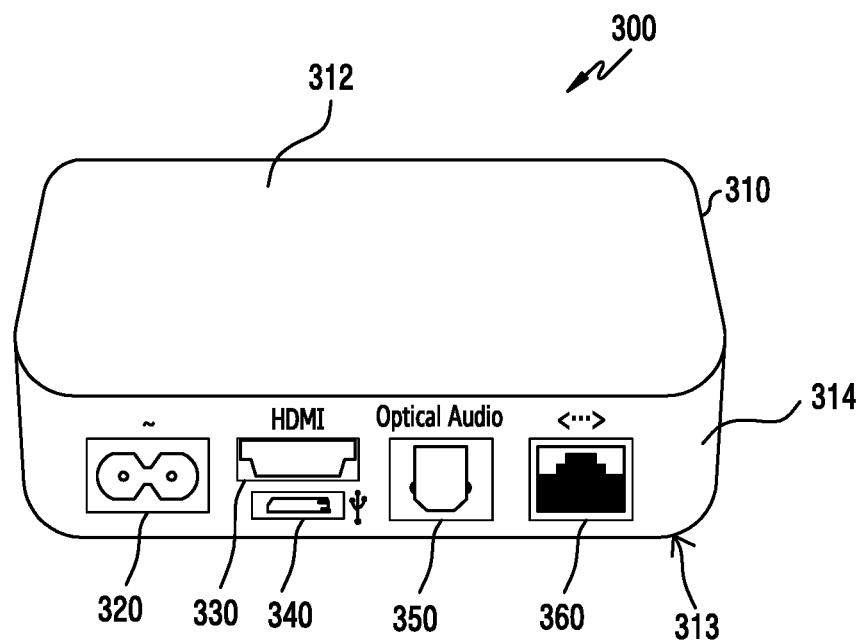
FIG. 3 is a perspective view of a control device for controlling IoT devices, according to an embodiment of the present disclosure.

Referring to FIG. 3 to FIG. 6, an IoT control device according to various embodiments is described below. FIG. 3 illustrates the external appearance of an IoT control device 300. The control device 300 illustrated in FIG. 3 may be used as the control device 110 illustrated in FIG. 1.

The control device 300 may include a housing 310, which includes a first surface 312, (e.g., a top surface), a second surface 313 facing away from the first surface 312 (e.g., a bottom surface), and at least one lateral surface 314 (e.g., a side surface) at least partially surrounding a space between the first surface 312 and the second surface 313. At least one of the above mentioned surfaces of the housing 310 may have a curved surface or a flat surface. For example, at least a portion of the plurality of surfaces of the housing 310 may be formed of semi-transparent or opaque materials.

According to one embodiment, one (e.g., the lateral surface 314) of the surfaces of the housing 310 may include at least one of a power connector 320 configured to receive power for the control device 300, or wired communication ports (for example, a High Definition Multimedia Interface (HDMI) port 330, a Universal Serial Bus (USB) port 340 (or a micro USB port), an optical audio output port 350, and an Internet port 360 (for example, an Ethernet port). In other embodiments, the ports 330 to 360 may be positioned at other locations on the surfaces of the housing 310 or in a different arrangement. In yet another embodiment, a different number and/or types of ports may be used.

Figure 4:
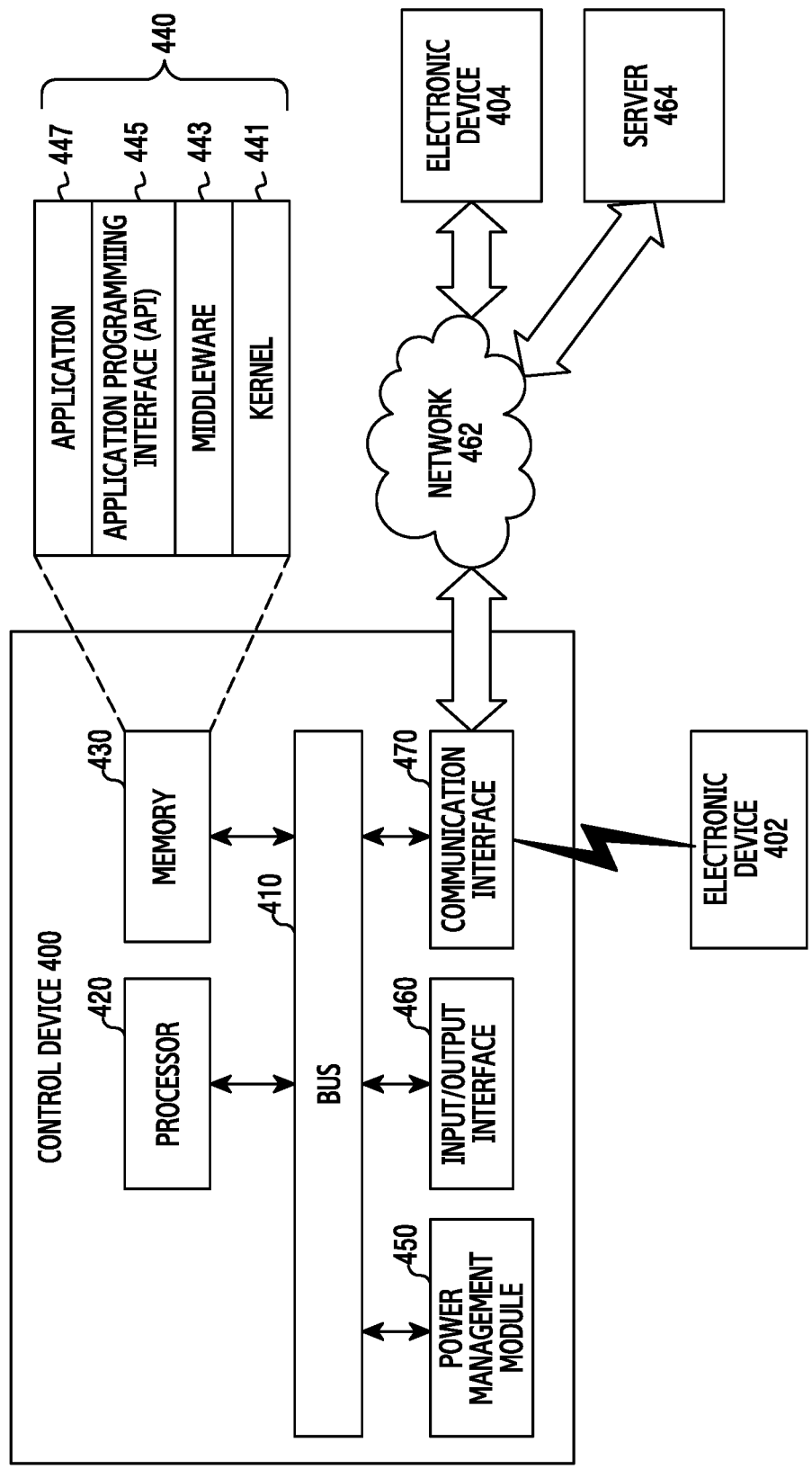
FIG. 4 is a schematic block diagram of a control device for controlling IoT devices, according to an embodiment of the present disclosure.

FIG. 4 illustrates an IoT control device, according to an embodiment. The control device 400 may include a bus 410, a processor 420, a memory 430 (for example, Dynamic Random Access Memory (DRAM) and/or a NAND flash), a power management module 450, an input/output interface 460, a communication interface 470, and an antenna (not shown) (for example, a 2.4 Giga Hertz (GHz), 5 GHz, or 60 GHz directional antenna). The antenna may have Multiple Input Multiple Output (MIMO) configuration. In certain embodiments, the control device 400 may not include at least one of the aforementioned elements or may additionally have other elements.

The bus 410 may include a circuit for connecting the above-mentioned elements (e.g., the processor 420, the memory 430, the power management module 450, the input/output interface 460, and the communication interface 470) to one another, and providing communication (e.g., exchange of control messages) between the elements.

The processor 420 may include one or more of a Central Processing Unit (CPU), an Application Processor (AP), or a Communication Processor (CP). The processor 420 may, for example, execute an operation or data processing for control and/or communication of at least one of the other elements of the control device 400.

According to one embodiment, the processor 420 may communicate a control signal and/or data with at least one of external electronic devices 402 or 404 through the communication interface 470. The external electronic device 402 may be an IoT device (for example, any of the IoT devices 120 to 130 illustrated in FIG. 1) or a device (for example, the electronic device 100-1 illustrated in FIG. 1) providing a user interface. The external electronic device 404 may also be an electronic device (for example, the electronic device 100-2 illustrated in FIG. 1) remotely connected to the control device 400. The processor 420 may also be connected to a server 464 connected to a network 462 (for example, a Local Area Network (LAN), a Wide Area Network (WAN), or the Internet), through the communication interface 470.

The memory 430 may include a volatile and/or a non-volatile memory. The memory 430 may store instructions and/or data related to at least one of the other element of the control device 400. As illustrated in FIG. 4, the memory 430 can store software and/or program 440. For example, the program 440 can include a kernel 441, a middleware 443, an Application Programming Interface (API) 445, and an application program 447. At least some of the kernel 441, the middleware 443, or the API 445 may be referred to as an Operating System (OS).

The kernel 441 may control or manage system resources (e.g., the bus 410, the processor 420, the memory 430, etc.) used for executing operations or functions implemented in other programs (e.g., the middleware 443, the API 445, or the application program 447). The kernel 441 may provide an interface for the middleware 443, the API 445, or the application program 447 to access the individual elements of the control device 400, thereby controlling or managing the system resources.

The middleware 443 may serve as a relay for the API 445 or the application program 447 to communicate and exchange data with the kernel 441. The middleware 443 may perform control over a work request received from the application program 447. For example, the middleware 443 may control (e.g., scheduling or load balancing) the work request by assigning priorities to at least one of the application programs 447 to use the system resources of the control device 400.

The API 445 may include an interface or a function (e.g., an instruction) for the application program 447 to control a function of the kernel 441 or the middleware 443. For example, the API 445 may include at least one interface, such as file control, window control, image processing, or text control.

The power management module 450 may control power for driving of the control device 400. For example, the power management module 450 may continuously supply an external power source connected through the power connector 320, to the control device 400, such that the control device 400 is continuously driven. For example, to reduce power consumption of the control device 400, the power management module 450 may control the external power source connected through the power connector 320, to supply the control device 400 with power, during an activation duration of the control device 400.

The input/output interface 460 may perform a role of an interface capable of forwarding an instruction or data inputted from a user or other external devices, to the other element(s) of the control device 400. In addition, the input/output interface 460 may output an instruction or data received from the other element(s) of the control device 400, to the user or other external devices.

The communication interface 470 may establish communication between the control device 400 and an external device (e.g., the first external electronic device 402, the second external electronic device 404, or the server 464). For example, the communication interface 470 may be connected to the network 462 through one or more of wireless communication or wired communication protocols or a combination of them, and communicate with the external device.

The wireless communication may include short-range communication or long-range communication. The long-range communication may use a cellular communication protocol, for example, at least one of Long Term Evolution (LTE), LTE-Advanced (LTE-A), Code Division Multiple Access (CDMA), Wide-CDMA (WCDMA), Universal Mobile Telecommunication System (UMTS), Wireless Broadband (WiBro), or Global System for Mobile communication (GSM). The wireless communication may support an existing wide-area cell and also a small-scale cell such as a pico cell or a femto cell. The short-range wireless communication may include, for example, at least one of WiFi, Bluetooth, BLE, Zigbee, IR, or ultrasound communication. The wired communication may include, for example, at least one of USB (universal serial bus), HDMI (high definition multimedia interface), Recommended Standard-232 (RS-232), power line communication, or Plain Old Telephone Service (POTS). The network 462 may include at least one of a telecommunications network, for example, a computer network (e.g., LAN or WAN), the Internet, or a telephone network.

As described above, the first or the second external electronic device 402 or 404 may be an electronic device providing a user interface for controlling an external electronic device through the Internet. In one embodiment, the server 464 may include a group of one or more servers. In various embodiments, the control device 400 may connect and control an external electronic device using at least one module that is operatively or physically separated from the processor 420.

In one embodiment, the control device 400 may include an operating system, applications, and a minimal storage device for data. Most data of acquired from IoT devices may be stored in a cloud. In certain embodiments, the software program of an application can include an IoT control-related portion and a user interface-related portion. In some embodiments, the control device 400 may not store the entirety of such software program, and can instead store or install only an IoT control-related portion of the software program. A user interface-related portion of the software program may also be stored in a mobile device operating as a user interface.

In some circumstances, the control device 400 may continuously connect to some IoT devices, while accessing other IoT devices periodically or intermittently as needed. When the control device 400 is configured to further include functionalities of other devices (for example, a TV set-top box, a media device, and/or a security panel), the control device 400 may further include hardware and/or software for performing the functionalities of such other devices.

Figure 5:
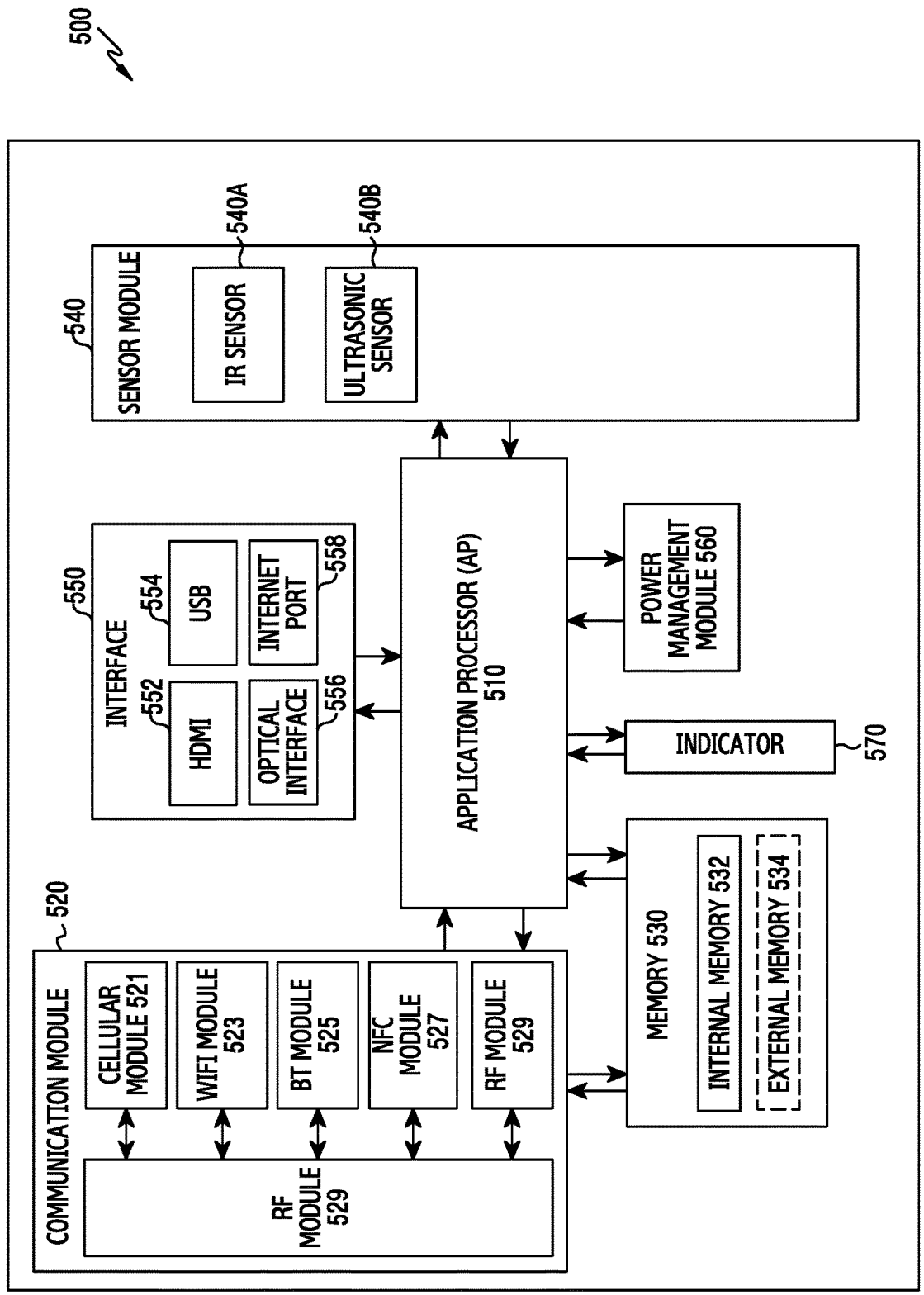
FIG. 5 is a schematic block diagram of a control device for controlling of IoT devices, according to an embodiment of the present disclosure.

FIG. 5 is a schematic hardware block diagram illustrating a control device according to one embodiment. In the description below, the control device 500 may, for example, be the whole or a portion of the control device 400 illustrated in FIG. 4. The illustrated control device 500 may include one or more of an application processor (AP) 510, a communication module 520, a memory 530, a sensor module 540, an interface 550, a power management module 560, or an indicator 570.

The AP 510 may drive an OS or application program, and thereby control a plurality of hardware or software components connected to the AP 510. The AP 510 may also process various data including multimedia data, or perform an operation. For example, the AP 510 may be implemented as a System on Chip (SoC).

The communication module 520 (e.g., the communication interface 470) may perform data transmission/reception in communication between the control device 500 (e.g., the control device 400) and other electronic devices connected through a network. The communication module 520 may include a cellular module 521, a WiFi module 523, a Bluetooth (BT) module 525, an NFC module 527, and an RF module 529. Although the communication module 520 is illustrated in FIG. 5 as including a number of different modules, the number and types of modules included therein may vary in other embodiments.

The cellular module 521 may provide an Internet service through a communication network (e.g., LTE, LTE-A, CDMA, WCDMA, UMTS, WiBro, GSM or the like). In one embodiment, the cellular module 521 may perform at least some of functions that can be provided by the AP 510. For example, the cellular module 521 may perform at least a portion of a multimedia control function.

In another embodiment, the cellular module 521 may include a communication processor (CP). For example, the cellular module 521 may be implemented as an SoC. Although the components such as the cellular module 521 (e.g., the communication processor), the memory 530, or the power management module 560 are shown to be separate from the AP 510 in FIG. 5, at least some (e.g., the cellular module 521) of the functionalities of such components may be implemented as part of the AP 510.

In one embodiment, the AP 510 or the cellular module 521 (e.g., the communication processor) may load, to a volatile memory, instructions or data received from a non-volatile memory (connected to a respective one of the AP 510 or the cellular module 521) or at least one of the other components, and process the loaded instructions or data. The AP 510 or the cellular module 521 may also store, in the non-volatile memory, data received from or generated by at least one of the other components.

At least one of the WiFi module 523, the BT module 525, or the NFC module 527 may include a processor for, for example, processing data transmitted/received through the corresponding module. Although the cellular module 521, the WiFi module 523, the BT module 525, or the NFC module 527 is shown to be separate from one another in FIG. 5, at least some (e.g., two or more) of the cellular module 521, the WiFi module 523, the BT module 525, or the NFC module 527 may be included within a single integrated chip (IC) or IC package. For example, at least some of the processors for the cellular module 521, the WiFi module 523, the BT module 525, or the NFC module 527 may be implemented as one SoC (e.g., the communication processor corresponding to the cellular module 521 and a WiFi processor corresponding to the WiFi module 523 may be combined on one SoC).

The RF module 529 may perform transmission and reception of data using RF signals. Although not illustrated, the RF module 529 may include a transceiver, a power amplification module (PAM), a frequency filter, and a low noise amplifier (LNA). In addition, the RF module 529 may further include components (for example, a conductor, a conducting wire, etc.) for transmitting and receiving electromagnetic waves over free space using wireless communication.

Although the cellular module 521, the WiFi module 523, the BT module 525, and the NFC module 527 are shown to share the RF module 529 in FIG. 5, at least one of the cellular module 521, the WiFi module 523, the BT module 525, or the NFC module 527 may perform transmission and reception through a separate RF module.

The memory 530 may include an internal memory 532 or an external memory 534. For example, the internal memory 532 may include at least one of a volatile memory (e.g., a DRAM, a Static Random Access Memory (SRAM), a Synchronous Dynamic Random Access Memory (SDRAM), etc.) or a non-volatile memory (e.g., a One Time Programmable Read Only Memory (OTPROM), a Programmable ROM (PROM), an Erasable Programmable ROM (EPROM), an Electrically Erasable Programmable ROM (EEPROM), a mask ROM, a flash ROM, a NAND flash memory, a NOR (NOR) flash memory, etc.).

In one embodiment, the internal memory 532 may include a Solid State Drive (SSD). The external memory 534 may include a flash drive, such as a Compact Flash (CF), a Secure Digital (SD), a Micro-Secure Digital (Micro-SD), a Mini-Secure Digital (Mini-SD), an extreme Digital (xD), or a memory stick. The external memory 534 may be operatively connected to the control device 500 through various interfaces. In another embodiment, the control device 500 may further include a storage device (or a storage medium), such as a hard drive.

The sensor module 540 may measure a physical quantity(ies) or detect an operational state(s) of the control device 500, and then convert the measured or detected information or values into an electrical signal(s). The sensor module 540 may include, for example, an IR sensor 540A or an ultrasound sensor 540B. The sensor module 540 may further include a control circuit for controlling one or more of sensors therein.

The interface 550 may include, for example, an HDMI 552, a USB 554, an optical interface 556, or an Internet port 558. The power management module 560 may manage electric power of the control device 500. Although not illustrated in FIG. 5, the power management module 560 may include a Power Management IC (PMIC), a charger IC, or a battery or fuel gauge.

For example, the PMIC may be mounted within an integrated circuit or an SoC semiconductor. A charging scheme may be a wired charging scheme or a wireless charging scheme. The charger IC may charge a battery, and may prevent the inflow of overvoltage or overcurrent from an electric charger. For example, the charger IC may include a charger IC for at least one of the wired charging scheme or the wireless charging scheme. Examples of the wireless charging scheme include a magnetic resonance scheme, a magnetic induction scheme, or an electromagnetic wave scheme. Supplementary circuits for wireless charging, for example, circuits such as a coil loop, a resonance circuit, a rectifier and the like, may also be added. The indicator 570 may indicate a specific state of the control device 500 or one portion (e.g., the AP 510) thereof, for example, a booting state, a message state, a charging state, etc.

At least one of the components of the control devices according to the embodiments described above may include one or more parts or sub-components, and the names of the components may be different, depending on the type of the control device. The control devices may also include at least one of the aforementioned components, and omit some components or further include additional components. In addition, some of the components of the above-described control devices may be combined and constructed as one entity, and may perform the same functions as the corresponding components before being combined.

Figure 6:
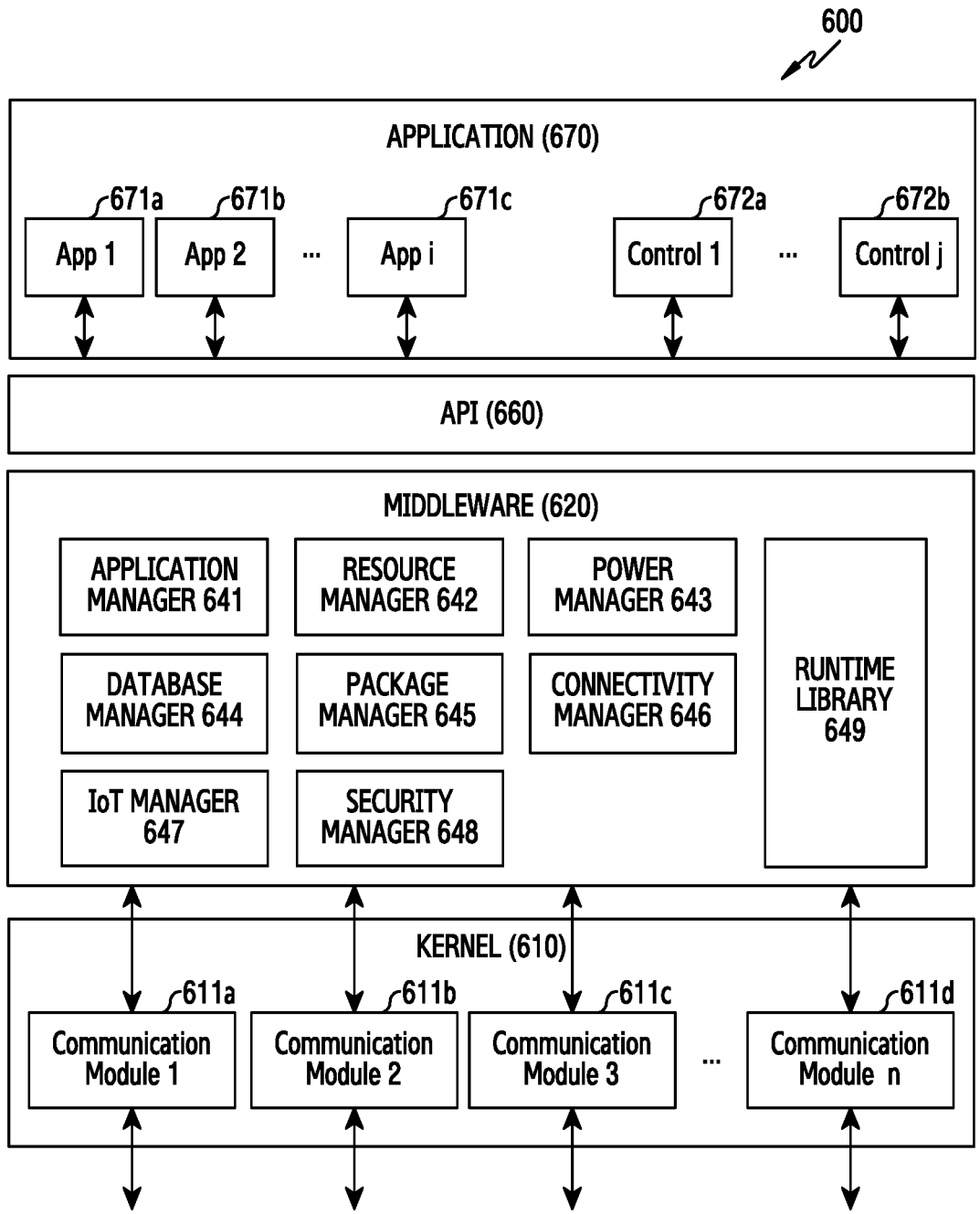
FIG. 6 is a schematic block diagram of a software stack of a control device for controlling IoT devices, according to an embodiment of the present disclosure.

FIG. 6 illustrates a software stack of a control device for controlling IoT devices, according to one embodiment. In the illustrated embodiment, a program module 600 (e.g., the program 440) may include a kernel 610, a middleware 620, an API 660, and an application layer 670. At least a portion of the program module 600 may be preloaded on a control device, such as the control device 400 or 500 of FIGS. 4 and 5, or may be downloaded from a server of a specific manufacturer (e.g., an IoT device manufacturer) or from an application program store provided by a main platform (e.g., Android®, iOS®, Tizen®, Firefox®, Windows Mobile®, Blackberry 10®, and the like).

At least a portion of the kernel 610 and the middleware 620 may be referred to as an operating system (OS) for controlling resources related to the control device (e.g., the control device 400). Various applications (e.g., the application program 447) running on the OS may be included on the application layer 670. Examples of operating systems may include Android®, iOS®, Windows®, Symbian®, Tizen®, Firefox®, and Bada®.

The kernel 610 (e.g., the kernel 441 of FIG. 4) may include, for example, a system resource manager (not shown) or a device driver (not shown). The system resource manager may perform control of a system resource, allocation thereof, or withdrawal thereof, etc. The system resource manager may include a process management unit, a memory management unit, a file system management unit, etc. The device driver may include, for example, a Bluetooth driver, a USB driver, a WiFi driver, or an inter-process communication (IPC) driver for managing each communication module 611a, 611b, 611c, or 611d for communicating with an external electronic device for the Internet communication of the control device.

In one embodiment, the control device (500 of FIG. 5) may be configured to detachably coupled or connected to various communication modules (in hardware, firmware, and/or software). For example, the control device includes only a first communication module at the time of sale of the control device. However, the control device may be configured to add a second communication module or replace the first module with the second module, depending on the user's needs. In this case, software on the kernel 610 for the communication module may be added or updated. In certain embodiments, for adding a new communication hardware module, a separate slot may be included in the housing of the control device (e.g., 300 of FIG. 3), and corresponding software may be downloaded to the control device.

The middleware 620 may provide a function commonly needed by the applications 670, or provide various functions to the applications 670 through the API 660, such that the applications 670 can efficiently use limited system resources within the control device. In one embodiment, the middleware 620 (e.g., the middleware 443) may include at least one of an application manager 641, a resource manager 642, a power manager 643, a database manager 644, a package manager 645, a connectivity manager 646, an IoT control manager 647, a security manager 648, or a runtime library 649.

The application manager 641 may manage, for example, a life cycle of at least one of the applications 670. The resource manager 642 may manage resources, such as source codes of at least any one of the applications 670, a memory, a storage space, etc.

The power manager 643 may, for example, operate together with a Basic Input/Output System (BIOS) to manage a battery or power source, and provide electric power information for an operation of the control device. The database manager 644 may create, search, or change a database that is used by at least one of the applications 670. The package manager 645 may manage installation or updating of an application which is distributed in a form of a package file.

The connectivity manager 646 may manage, for example, wireless connectivity such as WiFi, Bluetooth, etc. The IoT control manager 647 may manage connectivity and control with an external electronic device for controlling through IoT communication. The security manager 648 may provide a general security function for system security, user authentication, etc.

The runtime library 649 may include, for example, a library module used by a compiler to add a new function through a programming language during the execution of the application 670. Further, the runtime library 649 may perform a function for input/output management, memory management, and/or arithmetic function.

The middleware 620 may include a middleware module forming a combination of various functions of the aforementioned components. The middleware 620 may provide a module that is specialized for a specific operating system so as to provide a differentiated functionality. Further, the middleware 620 may dynamically delete some of the existing components or add new components.

The API 660 (e.g., the API 445) may include a set of API programming functions, and may have a different configuration in accordance with the operating system. For example, Android® or iOS® may provide one API set for the platform, while Tizen® may provide two or more API sets for the platform.

In one embodiment, the application layer 670 may include one or more application programs (e.g., the application program 447). The application layer 670 may include one or more application programs 671a to 671c, which can provide, for example, functions of a media player, a photo album, environmental information provision (e.g., air pressure, humidity, or temperature), etc.

In the illustrated embodiment, the application layer 670 may include one or more application programs 672a to 672b for controlling IoT devices. Each of the application programs 672a to 672b may include software adapted for a corresponding IoT device(s) or a type(s) of IoT devices. In one embodiment, for example, a first application program may include a program for controlling an IoT electric light from a first manufacturer while a second application program may include a program for controlling an IoT electric light from a second manufacturer.

In another embodiment, the first application program may include a program for controlling IoT electric lights from various manufacturers, while the second application program may include a program for controlling electronic home appliances from various manufacturers. In yet another embodiment, the application layer 670 may include application programs, each of which is configured to control a respective one of classes of IoT devices, as shown in the Table 1 above.

In one embodiment, at least a portion of the application programs may be preloaded onto the control device (500 of FIG. 5) when the control device is manufactured. In another embodiment, at least a portion of the application programs may be installed onto the control device after being downloaded by a user from an app store or Internet site (for example, a website of an IoT device manufacturer) after the purchase of the control device.

In certain embodiments, a generic application program may be installed on the control device. In such embodiments, the control device can be provided with information on the types, kinds, classifications, and/or manufacturers of one or more IoT devices to be controlled by the control device. Then, the control device may support various IoT devices using such information. In another embodiment, a combination of two or more of the above embodiments may be implemented.

In various embodiments, at least a portion of the program module 600 may be implemented in software, firmware, hardware, or a combination thereof. For example, at least a portion of the program module 600 may be implemented (e.g., executed) by a processor (e.g., an application program). At least a portion of the program module 600 may include a module, a program, a routine, sets of instructions, or a process for performing one or more functions. A combination of any of the above-described embodiments may also be implemented.

User Interface of an IoT Control Device

Figure 7:
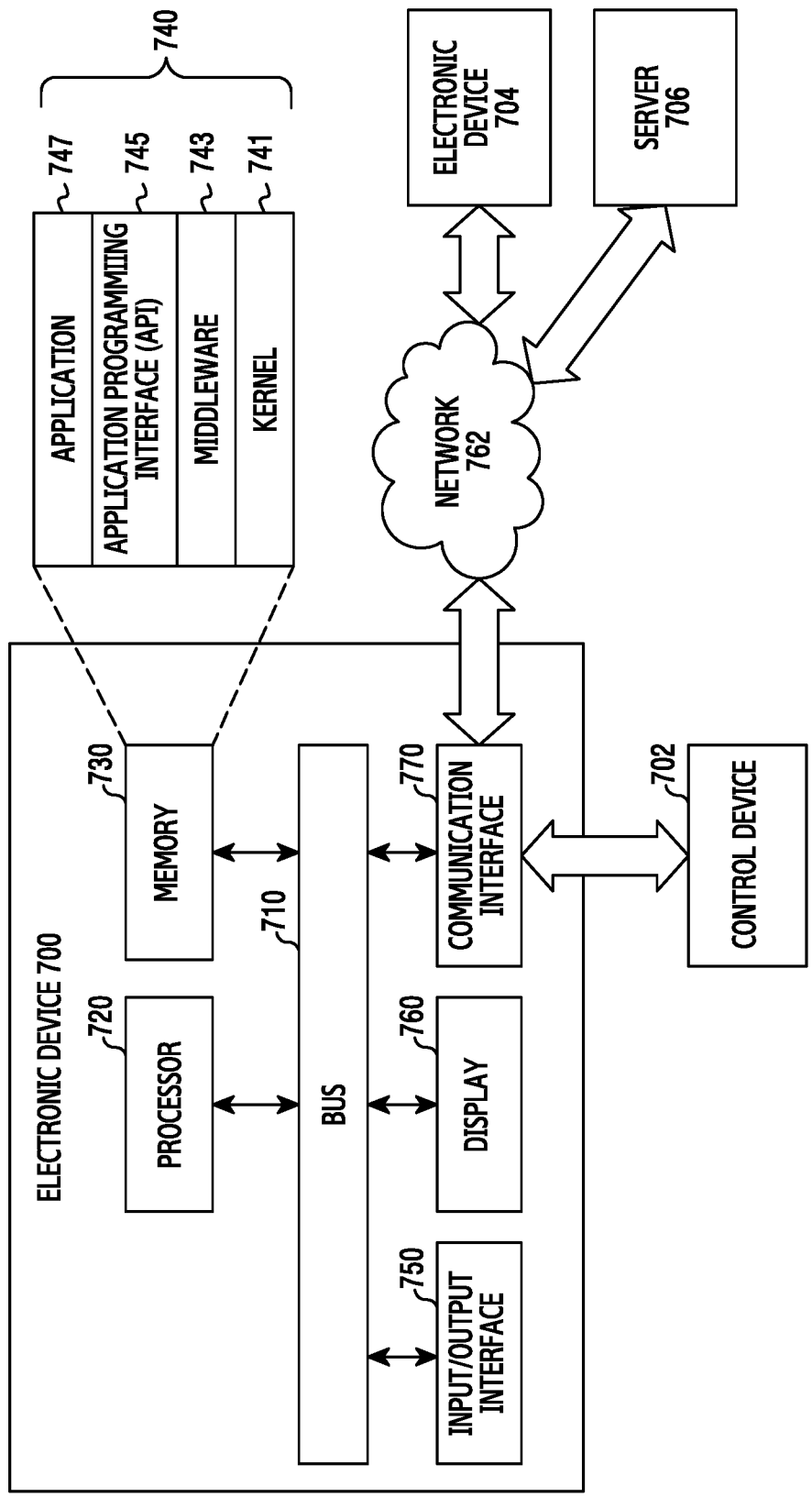
FIG. 7 is a schematic block diagram of an electronic device for providing a user interface for a control device for controlling IoT devices, according to an embodiment of the present disclosure.

Referring to FIG. 7, an electronic device 700 for providing a user interface for an IoT control device (for example, 500 of FIG. 5) according to one embodiment will be described below. The illustrated electronic device 700 may include a bus 710, a processor 720, a memory 730, an input/output interface 750, a display 760, and a communication interface 770. In certain embodiments, at least one of the above components may be omitted and/or additional or alternative components may be included. In one embodiment, the electronic device 700 may be a mobile device, such as a smartphone, a tablet computer, a laptop computer, or a wearable device.

The bus 710 may include a circuit that connects the aforementioned components (e.g., the processor 720, the memory 730, the input/output interface 750, the display 760, or the communication interface 770) to one another, and provides communication (e.g., a control message) between the components.

The processor 720 may include one or more of a CPU, an AP, or a CP. For example, the processor 720 may execute operation or data processing for control and/or communication of at least one other component of the electronic device 700.

The memory 730 may include a volatile and/or non-volatile memory. The memory 730 may store an instruction or data related to at least one other component of the electronic device 700. In FIG. 7, the memory 730 may store software and/or a program 740. For example, the program 740 may include a kernel 741, a middleware 743, an API 745, and an application program 747 (e.g., application) or the like. At least a portion of the kernel 741, the middleware 743, or the API 745 may be collectively referred to as an OS.

The kernel 741 may control or manage system resources (e.g., the bus 710, the processor 720, or the memory 730) used for executing operations or functions implemented in other programs (e.g., the middleware 743, the API 745, or the application program 747). The kernel 741 may provide an interface for the middleware 743, the API 745, or the application program 747 to access the individual component of the electronic device 700, in order to control or manage the system resources.

The middleware 743 may serve as a relay for the API 745 or the application program 747 to communicate with the kernel 741 and exchange data with the kernel 741. The middleware 743 may provide control over a work request received from the application program 747. For example, the middleware 733 may provide the control (e.g., scheduling or load balancing) over the work request, by allotting at least one of the application programs 747 to use the system resources of the electronic device 700.

The API 745 may include an interface or function (e.g., instructions) for the application program 747 to control a function of the kernel 741 or the middleware 743. For example, the API 745 may include at least one interface, such as file control, window control, image processing, or character control.

The input/output interface 750 may serve as an interface to provide an instruction or data inputted from a user or other external devices, to the other components of the electronic device 700, and may output an instruction or data received from the other components of the electronic device 700, to the user or other external devices.

For example, the display 760 may include a liquid crystal display (LCD), a light emitting diode (LED) display, an organic light emitting diode (OLED) display, a microelectromechanical systems (MEMS) display, or an electronic paper display. The display 760 may display various kinds of information (e.g., text, an image, a video, an icon, a symbol, etc.) to a user. The display 760 may include a touch screen, which receives touch, gesture, and/or proximity input from a stylus (e.g., hovering input), an electronic pen, or one portion of the human body (e.g., finger) of the user.

The communication interface 770 may connect the electronic device 700 to an external device (e.g., a control device 702, an external electronic device 704, or a server 706). For example, the communication interface 770 may be connected to the network 762 through wireless communication or wired communication, and thereby provide communication with the external device.

For example, the wireless communication may use a cellular communication protocol, for example, at least one of LTE, LTE-A, CDMA, WCDMA, UMTS, WiBro, or GSM. Further, the wireless communication may include at least one of WiFi, Bluetooth, BLE, Zigbee, IR, or ultrasound communication. For example, the wired communication may utilize at least one of USB, HDMI, RS-232, or POTS (plain old telephone service). The network 762 may include at least one of a telecommunications network, for example, a computer network (e.g., a LAN or WAN), the Internet, or a telephone network.

The external electronic device 704 may be a device of the same type as or different type from the electronic device 700. In one embodiment, the server 706 may include a group of one or more servers.

In various embodiments, all or some operations executable by the electronic device 700 may be executed together with another electronic device or by a plurality of electronic devices (e.g., the control device 702, the external electronic device 704, or the server 706). In one embodiment, when the electronic device 700 performs a function or service, automatically or in response to a request, the electronic device 700 may send a request to perform at least a portion of the function or service to other devices (e.g., the control device 702, the external electronic device 704, or the server 706), instead of or in addition to executing the function or service by itself. The other electronic devices (e.g., the control device 702, the external electronic device 704, or the server 706) may execute the function or an additional function requested by the electronic device 700, and provide the execution result to the electronic device 700. The electronic device 700 may then use the received result as is or process it further, and provide the requested function or service to the other electronic devices. For example, cloud computing, distributed computing, or a client-server computing technology may be used for such purposes.

In various embodiments, the electronic device 700 may acquire information on an external electronic device through at least one module operatively or physically separated from the processor 720, and install a software program related to the external electronic device. In one embodiment, the processor 720 may acquire information on at least one external electronic device 704 (for example, an IoT device). For example, the processor 720 can obtain such information by using at least one of a code or tag attached to or provided along with the at least one external electronic device 704. The code may include, for example, at least one of a bar code or a QR code. The tag may include, for example, at least one of an RFID, an NFC tag, or a BLE tag.

In one embodiment, the processor 720 may derive or estimate location information of the at least one external electronic device 704. For example, such an electronic device 704 can be an IoT device which is at a fixed location at least temporarily. When acquiring information of the at least one external electronic device 704 for control through an IoT environment, the processor 720 may regard the location of the electronic device 700 at such time as the location of the external electronic device 704. For example, the processor 720 may estimate the location of the electronic device 704, using positioning technologies, such as Simultaneous Location And Mapping (SLAM), LTE Positioning Protocol extension (LPPe) 2.0, etc.

In one embodiment, the processor 720 may access the server 706, and receive at least a portion of a software program corresponding to the information on the external electronic device 704, and then install the received portion of the software program onto the electronic device 700. For example, the processor 720 may control the display 760 to display a category list received from an application program store through the communication interface 770. If an IoT-related category is selected by a use from the category list displayed on the display 760, the processor 720 may then control the display 760 to display a software program list included in the selected category.

If a software program related to the external electronic device 704 is selected from the software program list, the processor 720 may receive at least a portion of the selected software program and install the received portion of the software program onto the electronic device 700. In one embodiment, the processor 720 may install onto the electronic device 700 at least a portion of a software program, and the at least a portion may provide a user interface of the external electronic device 704. In another embodiment, the processor 720 may install onto the electronic device 700 at least some portions of a software program, and the portions can provide a user interface and control for the external electronic device 704.

In one embodiment, the processor 720 may transmit information on the external electronic device 704 to the control device 702. For example, the processor 720 may transmit identification information of the external electronic device 704 or identification information of a software program related to the external electronic device 704 to the control device 702. In other embodiments, the processor 720 may display an icon of an application program for IoT on the display 760. When the application program for IoT is executed, the display 760 may then display a software program list for controlling IoT devices.

In another embodiment, the display 760 may display a software program folder for IoT. For example, when the software program folder is selected, the display 760 may display a software program list including items or icons representing software programs for controlling external electronic devices controllable by the electronic device 700.

Figure 8:
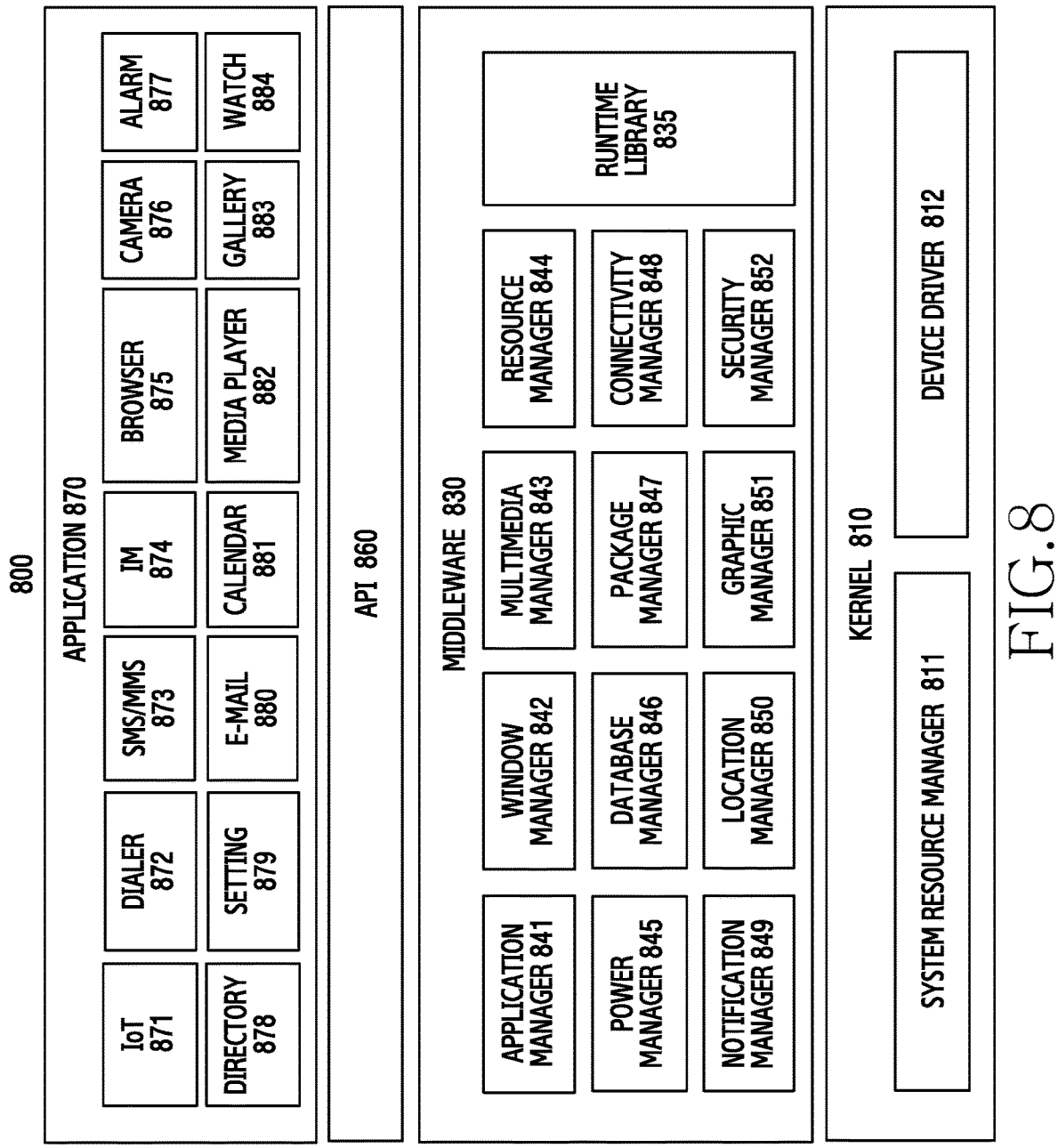
FIG. 8 is a schematic block diagram of a software stack of an electronic device for providing a user interface for a control device for controlling IoT devices, according to an embodiment of the present disclosure.

FIG. 8 illustrates a program module of an electronic device, according to one embodiment. In the illustrated embodiment, the program module 800 (e.g., the program 740) may include an OS for controlling resources related to an electronic device (e.g., the electronic device 700) and/or various applications (e.g., the application program 747) running on the operating system. The operating system may be, for example, Android®, iOS®, Windows®, Symbian®, Tizen®, Bada® or the like.

The program module 800 may include a kernel 810, a middleware 830, an API 860, and/or an application (application program) 870. At least a portion of the program module 800 may be preloaded on the electronic device or downloaded from a server.

The kernel 810 (e.g., the kernel 741 of FIG. 7) may, for example, include a system resource manager 811 or a device driver 812. The system resource manager 811 may provide control of a system resource, allocation thereof, withdrawal thereof, etc. For example, the system resource manager 811 may include a process management unit, a memory management unit, or a file system management unit. The device driver 812 may include a display driver, a camera driver, a Bluetooth driver, a shared memory driver, a USB driver, a keypad driver, a WiFi driver, an audio driver, a battery driver, a touch driver, or an IPC driver.

The middleware 830 may provide a function commonly required by the applications 870, or provide various functions to the applications 870 through the API 860, such that the application 870 may make efficient use of restricted system resources within the electronic device. In FIG. 8, the middleware 830 (e.g., the middleware 743) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, or a security manager 852.

The runtime library 835 may include a library module that is used by a compiler to add a new function through a programming language, while the application 870 is run. The runtime library 835 may perform a function such as input/output, memory management, and arithmetic function and the like.

The application manager 841 may manage a life cycle of at least one of the applications 870. The window manager 842 may manage a GUI resource used in a screen. The multimedia manager 843 may determine a format necessary for playing various media files, and conduct encoding or decoding of the media file using a codec adapted to the corresponding format. The resource manager 844 may manage a resource such as a source code of at least any one of the applications 870, a memory, a storage space, etc.

The power manager 845 may operate together with a BIOS and manage a battery or power source, and may provide electric power information for an operation of the electronic device. The database manager 846 may create, search, or change a database that will be used in at least one of the applications 870. The package manager 847 may manage installation or updating of an application, which is distributed in a form of a package file.

The connectivity manager 848 may manage wireless connectivity, such as WiFi, or Bluetooth. The notification manager 849 may display or notify an event such as an arrival message, an appointment, a proximity notification, etc., preferably, in a way not disturbing a user. The location manager 850 may manage location information of the electronic device. The graphic manager 851 may manage a graphic effect to be provided to a user or a user interface. The security manager 852 may provide a general security function for system security, user authentication, etc. In one embodiment of the present disclosure, when the electronic device (e.g., the electronic device 700) includes a telephony function, the middleware 830 may further include a telephony manager for managing a voice or video telephony function of the electronic device.

The middleware 830 may include a middleware module forming a combination of various functions of the aforementioned components. For example, the middleware 830 may provide a module that is specialized, depending on the operating system, to provide a differentiated function. The middleware may dynamically delete some of the existing components or add new components.

The API 860 (e.g., the API 745) may include a set of API programming functions, and may be provided to have different configurations in accordance with different operating systems. For example, Android® or iOS® may provide one API set for the platform, while Tizen® may provide two or more API sets for the platform.

The application 870 (e.g., the application program 747) may include one or more applications, a respective one or a combination of which provides at least one of functions of an IoT user interface 871, a dialer 872, a Short Message Service/Multimedia Message Service (SMS/MMS) 873, an Instant Messenger (IM) 874, a browser 875, a camera 876, an alarm 877, a contact or directory 878, device setting 879, an e-mail 880, a calendar 881, a media player 882, a gallery 883, and a watch 884. Although not illustrated, the application 870 may also include one or more applications for providing functions for health care (e.g., measuring an exercise amount, a blood glucose level, or blood pressure), providing environment information, etc.

For example, the application 870 may include an application (hereinafter, referred to as "information exchange application") that supports information exchange between (1) the electronic device (e.g., the electronic device 700) and (2) an external electronic device or control device. The information exchange application may, for example, include a notification relay application for relaying specific information to the control device or a device management application for managing the external electronic device.

For example, the notification relay application may include a function of relaying, to the external electronic device, notification information generated in other applications (e.g., an SMS/MMS application, an e-mail application, a health care application, an environment information application, etc.) of the electronic device. In addition, the notification relay application may receive notification information from the control device and provide the received notification information to a user.

In one embodiment, the device management application may manage (e.g., install, delete, or update) a function. The function may include, for example, turning on/turning off of the external electronic device itself (or some components thereof). The function may also or alternatively include adjusting a brightness (or resolution) of a display of the external electronic device communicating with the electronic device. In other embodiments, the function may include managing an application running on the external electronic device, or a service (e.g., a telephony service or a message service) provided by the external electronic device.

In one embodiment, the application 870 may include an application, based on the attribute(s) or type of the external electronic device. For example, the application 870 may include a health care application, when the electronic device is a mobile medical device.

The application 870 may include an application received from an external electronic device (e.g., a server or an electronic device). The application 870 may include a preloaded application or a third party application downloadable from a server. In other embodiments, the individual components of the program module 800 illustrated embodiment may be referred to differently or configured differently, depending on the operating system.

At least a portion of the program module 800 may be implemented by software, firmware, hardware, or a combination thereof. The portion of the program module 800 may be, for example, implemented (e.g., executed) by a processor (e.g., an application program). The portion of the program module 800 may include, for example, a module, a program, a routine, sets of instructions, or a process for performing one or more functions.

Figure 9:
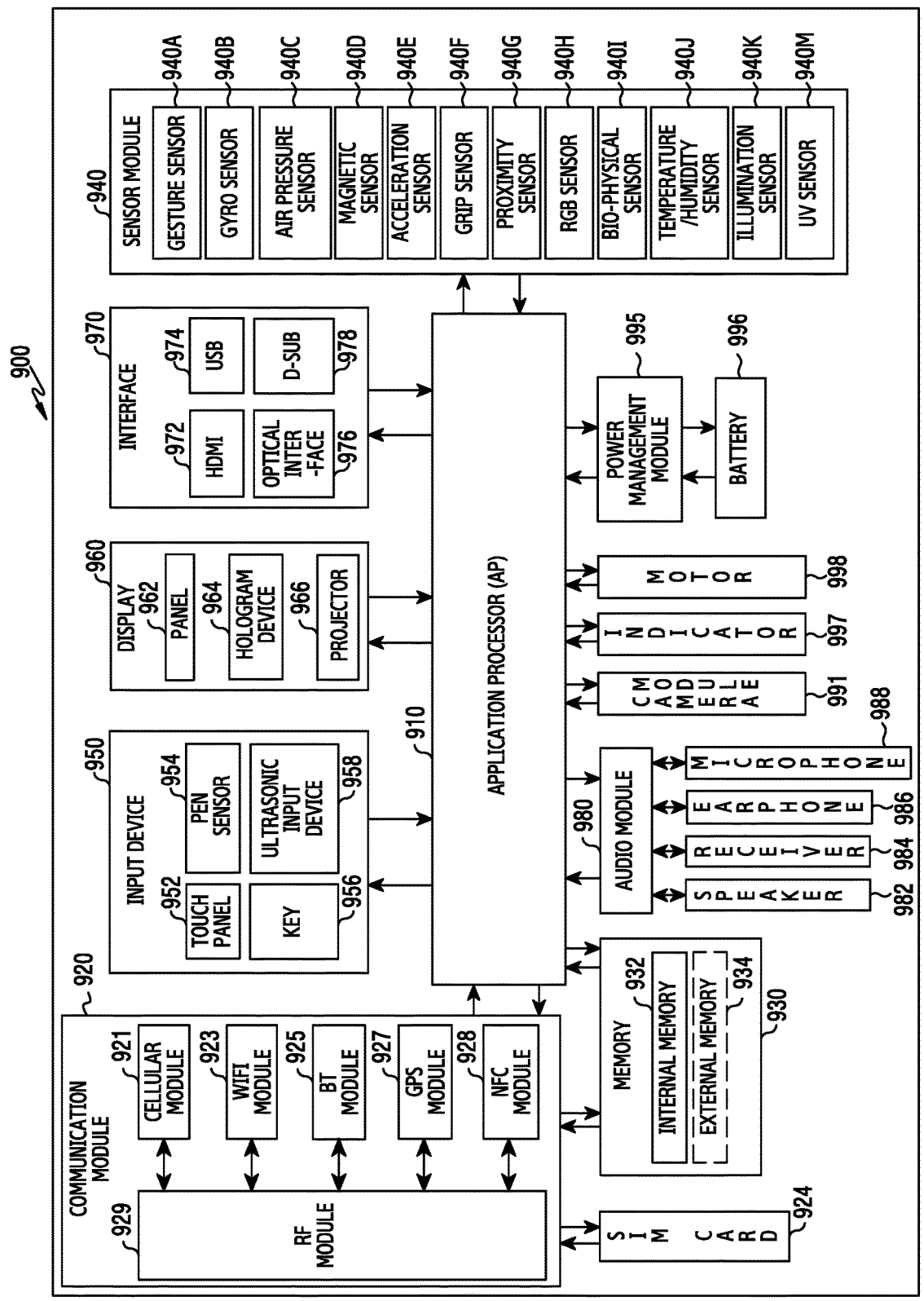
FIG. 9 is a schematic block diagram of an electronic device for providing a user interface for a control device for controlling IoT devices, according to an embodiment of the present disclosure.

FIG. 9 is a block diagram illustrating an electronic device according to one embodiment. In the following description, the electronic device 900 may form, for example, the whole or part of the electronic device 700 illustrated in FIG. 7. Referring to FIG. 9, the electronic device 900 may include one or more of an application processor (AP) 910, a communication module 920, a Subscriber Identification Module (SIM) card 924, a memory 930, a sensor module 940, an input device 950, a display 960, an interface 970, an audio module 980, an image sensor module 991, a power management module 995, a battery 996, an indicator 997, or a motor 980.

The AP 910 may drive an OS or application program, and control a plurality of hardware or software components connected or coupled to the AP 910. The API 910 may also process various kinds of data including multimedia data, or perform an operation. For example, the AP 910 may be implemented as a SoC. Although not illustrated, the AP 910 may also include a Graphic Processing Unit (GPU).

The communication module 920 (e.g., the communication interface 770) may perform data transmission and reception in communication between the electronic device 900 (e.g., the control device 700) and other electronic devices (e.g., the control device 702) connected through a network. In one embodiment, the communication module 920 may include a cellular module 921, a WiFi module 923, a BT module 925, a GPS module 927, an NFC module 928, or an RF module 929.

The cellular module 921 may provide voice telephony, video telephony, a text service, an Internet service, etc., through a communication network (e.g., LTE, LTE-A, CDMA, WCDMA, UMTS, WiBro, or GSM). In addition, the cellular module 921 may identify or authenticate an electronic device within a communication network using a subscriber identification module (e.g., the SIM card 924). Further, the cellular module 921 may perform at least some of functions that can be provided by the AP 910. For example, the cellular module 921 may perform at least a portion of a multimedia control function.

In one embodiment, although not illustrated, the cellular module 921 may include a Communication Processor (CP). The cellular module 921 may also be implemented as an SoC. In FIG. 9, although the components, such as the cellular module 921 (e.g., the communication processor), the memory 930, and the power management module 995 are shown to be separate from the AP 910, the AP 910 may be implemented to include at least some (e.g., the cellular module 921) of the functionality of the aforementioned components.

The AP 910 or the cellular module 921 (e.g., the communication processor) may load, to a volatile memory, an instruction or data received from a non-volatile memory connected to a respective one of the AP 910 and the cellular module 921 or at least one of the other components, and process the loaded instruction or data. The AP 910 or the cellular module 921 may also store, in the non-volatile memory, data received from at least one of the other components or generated by at least one of the other components.

Although not illustrated in FIG. 9, each of the WiFi module 923, the BT module 925, the GPS module 927 or the NFC module 928 may include a processor for processing data transmitted/received through the corresponding module. Further, although the cellular module 921, the WiFi module 923, the BT module 925, the GPS module 927, or the NFC module 928 is shown to be a separate block, at least some (e.g., two or more) of the cellular module 921, the WiFi module 923, the BT module 925, the GPS module 927, or the NFC module 928 may be included within one IC or IC package. For example, at least some (e.g., the communication processor corresponding to the cellular module 921 and a WiFi processor corresponding to the WiFi module 923) of the processors each corresponding to the cellular module 921, the WiFi module 923, the BT module 925, the GPS module 927, or the NFC module 928 may be implemented as one SoC.

The RF module 929 may perform transmission and reception of data using an RF signal. Although not illustrated, the RF module 929 may include a transceiver, a power amp module (PAM), a frequency filter, and a low noise amplifier (LNA). The RF module 929 may also include a component (for example, a conductor, a conducting wire, etc.) for transmitting and receiving electromagnetic waves on free space in wireless communication. Although the cellular module 921, the WiFi module 923, the BT module 925, the GPS module 927, and the NFC module 928 are shown to share one RF module 929 in FIG. 9, in other embodiments, at least one of the cellular module 921, the WiFi module 923, the BT module 925, the GPS module 927, or the NFC module 928 may perform transmission and reception through separate RF modules.

The RF module 929 may include at least one of a main antenna or a sub antenna operatively connected to the electronic device 900. For example, the communication module 920 may support multiple input multiple output (MIMO) using the main antenna and the sub antenna.

The SIM card 924 may be a card including a subscriber identification module, and may be inserted into a slot provided in the electronic device. The SIM card 924 may include unique identification information (e.g., Integrated Circuit Card ID (ICCID)) or subscriber information (e.g., an International Mobile Subscriber Identity (IMSI)).

The memory 930 includes an internal memory 932 or an external memory 934. For example, the internal memory 932 may include at least one of a volatile memory (e.g., a DRAM, an SRAM, an SDRAM and the like) or a non-volatile memory (e.g., an OTPROM, a PROM, an EPROM, an EEPROM, a mask ROM, a flash ROM, a NAND flash memory, a NOR flash memory and the like).

In one embodiment, the internal memory 932 may be a Solid State Drive (SSD), and the external memory 934 may include a flash drive, such as a CF (compact flash), an SD (secure digital), a Micro-SD (micro secure digital), a Mini-SD (mini secure digital), an xD (extreme digital), or a memory stick. The external memory 934 may be operatively connected to the electronic device 900 through various interfaces. For example, the electronic device 900 may further include a storage device (or a storage medium) such as a hard drive.

The sensor module 940 may meter a physical quantity or detect a state of the electronic device 900, and convert metered or detected information into an electrical signal. The sensor module 940 may include at least one of a gesture sensor 940A, a gyro sensor 940B, an air pressure sensor 940C, a magnetic sensor 940D, an acceleration sensor 940E, a grip sensor 940F, a proximity sensor 940G, a color sensor 940H (e.g., a Red Green Blue (RGB) sensor), a bio-physical sensor 940I, a temperature/humidity sensor 940J, an illumination sensor 940K, and a ultraviolet (UV) sensor 940M. Although not illustrated, the sensor module 940 may additionally or alternatively include an electronic nose (E-nose) sensor, an electromyography (EMG) sensor, an electroencephalogram (EEG) sensor, and Electrocardiogram (ECG) sensor, an IR sensor, an ultrasound sensor, an iris sensor, a fingerprint sensor, etc. The sensor module 940 may further include a control circuit for controlling at least one of the sensors included therein.

The input device 950 may include a touch panel 952, a (digital) pen sensor 954, a key 956, or an ultrasonic input device 958. The touch panel 952 may recognize, for example, a touch input, using at least one of a capacitive scheme, a pressure sensitive scheme, an infrared scheme, or an ultrasonic scheme. The touch panel 952 may also include a control circuit. In the capacitive scheme, physical touch or proximity (hovering) recognition is possible. The touch panel 952 may also include a tactile layer, such that the touch panel 952 may provide a tactile response to a user.

The (digital) pen sensor 954 may be implemented using the same or similar method to receiving a user's touch input or a separate recognition sheet (such as a pad manufactured by Wacom®). The key 956 may include a physical or mechanical button, an optical key, or a keypad. The ultrasonic input device 958 includes an input device for generating ultrasonic signal, and a microphone for sensing an acoustic or sound wave, and thereby identifies data, such that it can perform wireless recognition or sensing. In other embodiments, the electronic device 900 may receive a user input from an external device (e.g., a computer or a server) connected to the electronic device 900 using the communication module 920.

The display 960 (e.g., the display 760) may include a panel 962, a hologram device 964, and/or a projector 966. For example, the panel 962 may include an LCD, an AMOLED, etc. The panel 962 may be implemented to be flexible, transparent, or wearable. The panel 962 may be also implemented as one module together with the touch panel 952. The hologram 964 may display a three-dimensional image in the air by using interference of light. The projector 966 may display an image by projecting light to a screen, which may be located inside or outside of the electronic device 900. In one embodiment, the display 960 may further include a control circuit for controlling the panel 962, the hologram 964, and/or the projector 966.

The interface 970 may include an HDMI 972, a USB 974, an optical interface 976, or a D-subminiature (D-sub) 978. Although not illustrated, the interface 970 may additionally or alternatively include a Mobile High-definition Link (MHL) interface, a Secure Digital (SD) card/Multi Media Card (MMC) interface, and/or an Infrared Data Association (IrDA) standard interface.

The audio module 980 may convert a sound into an electric signal or vice versa. For example, the audio module 980 may process sound information that is inputted or outputted through a speaker 982, a receiver 984, an earphone 986, and/or a microphone 988.

The image sensor module 991 captures still and moving pictures. For example, the image sensor module 991 may include one or more image sensors (e.g., front sensor or rear/back sensor), a lens, an image signal processor (ISP, not shown), and a flash (e.g., an LED or a xenon lamp).

The power management module 995 may manage electric power of the electronic device 900. Although not illustrated, the power management module 995 may include a PMIC, a charger IC, or a battery or fuel gauge.

The PMIC may be mounted, for example, within an integrated circuit or an SoC semiconductor. A charging scheme may be a wired charging scheme or a wireless charging scheme. The charger IC may charge a battery, and may prevent the inflow of overvoltage or overcurrent from an electric charger. The charger IC may include a charger IC for at least one of the wired charging scheme or the wireless charging scheme. Examples of the wireless charging schemes include a magnetic resonance scheme, a magnetic induction scheme, and an electromagnetic wave scheme. Supplementary circuits for wireless charging, such as a coil loop, a resonance circuit, a rectifier, etc., may also be added.

The battery gauge may measure a level of the battery 996, a voltage during charging, an electric current, and/or a temperature. The battery 996 may store or generate electricity, and may supply a power source to the electronic device 900 using the stored or generated electricity. For example, the battery 996 may include a rechargeable battery or a solar battery.

The indicator 997 may indicate a specific state of the electronic device 900 or a component (e.g., the AP 910) thereof, for example, a booting state, a message state, a charging state, etc. The motor 998 may convert an electric signal into a mechanical vibration. Although not illustrated, the electronic device 900 may also include a processing device (e.g., a GPU) for mobile TV support, which processes standard media data of Digital Multimedia Broadcasting (DMB), Digital Video Broadcasting (DVB), a media flow, etc.

Each of the aforementioned components of the electronic device of the above-described embodiments of the present disclosure may include one or more components. The names of the corresponding components may be different, depending on the electronic device. Further, the electronic devices may include at least one of the aforementioned components, and may omit some components or further include additional components. In other embodiments, some of the components of the electronic devices of the above-described embodiments may be combined and implemented as one entity, while still identically performing the functions of the corresponding components before combination.

Process for Connecting IoT Device to IoT Control Device

In the embodiments described above with reference to FIGS. 1 to 9, various IoT devices may be controlled via connection with an IoT control device. Such IoT devices may be controlled using an electronic device such as a smart phone to users' convenience. However, as various IoT devices are manufactured by many different manufacturers, it may be difficult for consumers to connect such various IoT devices to an IoT control device. There may also be a need for easily connecting a plurality of the IoT devices to an IoT control device. In certain embodiments, simple low-end IoT devices may not include a user interface, or even a connection port (for example, a USB port). Accordingly, there is a need for a method to connect such a IoT device to an IoT control device and/or a user interface device. Additionally, there may be a need for an efficient and simple method of connecting IoT devices to an IoT control device.

Figure 10A:
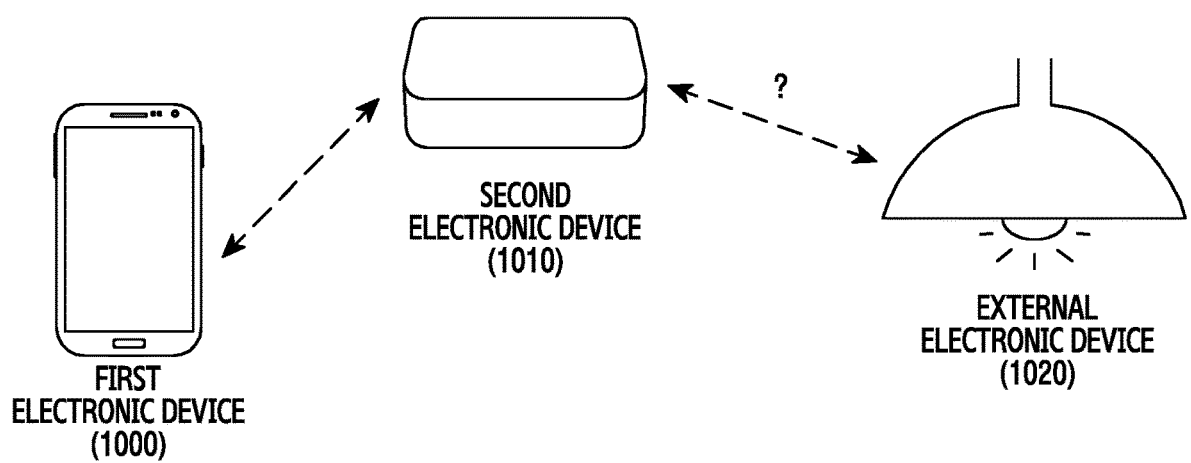
FIGS. 10A to 10F illustrate one embodiment of a method of connecting IoT devices to a control device.

Referring to FIGS. 10A to 10F and FIG. 11, one embodiment of a method of connecting an IoT device to an IoT control device is described below. Referring to FIG. 10A, a first electronic device 1000 (e.g., the electronic device 700 of FIG. 7) may be a mobile device, such as a smart phone, and a second electronic device 1010 (e.g., the control device 400 of FIG. 4) may be an IoT control device.

As described above in reference to FIGS. 7 to 9, the mobile device 1000 may serve as a user interface of the IoT control device 1010. In addition, as described above with reference to FIGS. 1 to 6, the IoT control device 1010 may control various external electronic devices or IoT devices 1020. In the illustrated embodiment, the IoT control device 1010 may control an IoT device 1020, such as a smart electric light (alternatively referred to as a smart light bulb, smart light, smart lamp, or smart lighting). In other embodiments, however, the IoT device 1020 may be one or more of various other IoT devices (for example, 120 to 130 of FIG. 1).

Referring back to FIG. 10A, the mobile device 1000 and the IoT control device 1010 have been previously connected to each other and are in communication with each other. The smart electric light 1020 may not include an external port, and may have a simple function and configuration (similar to, for example, the configuration illustrated in FIG. 2B). Therefore, for controlling the smart electric light 1020, using the IoT control device 1010, there can be a need to connect the smart electric light 1020 to the IoT control device 1010. In such a case, because the IoT control device 1010 is often positioned at a specific location, it may not be moved easily. In such circumstances, one embodiment of a method for connection and installation of the smart electric light 1020, using the mobile device 1000, will be described below with reference to FIGS. 10B to 10F and FIG. 11.

(1) IoT Device Recognition

Figure 10B:
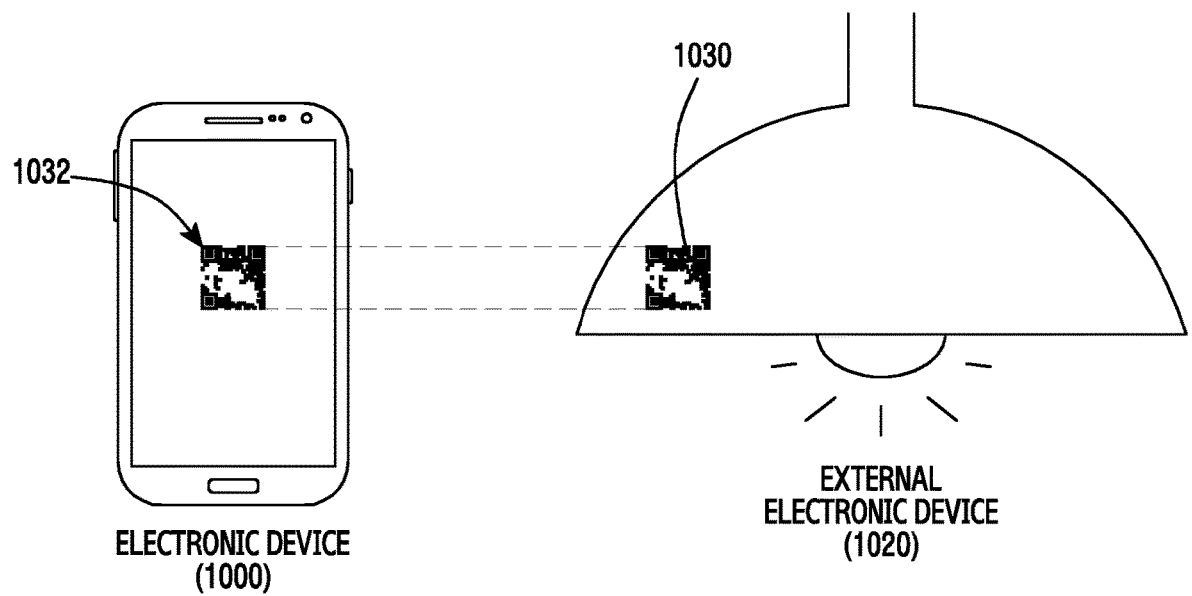
Figure 11:
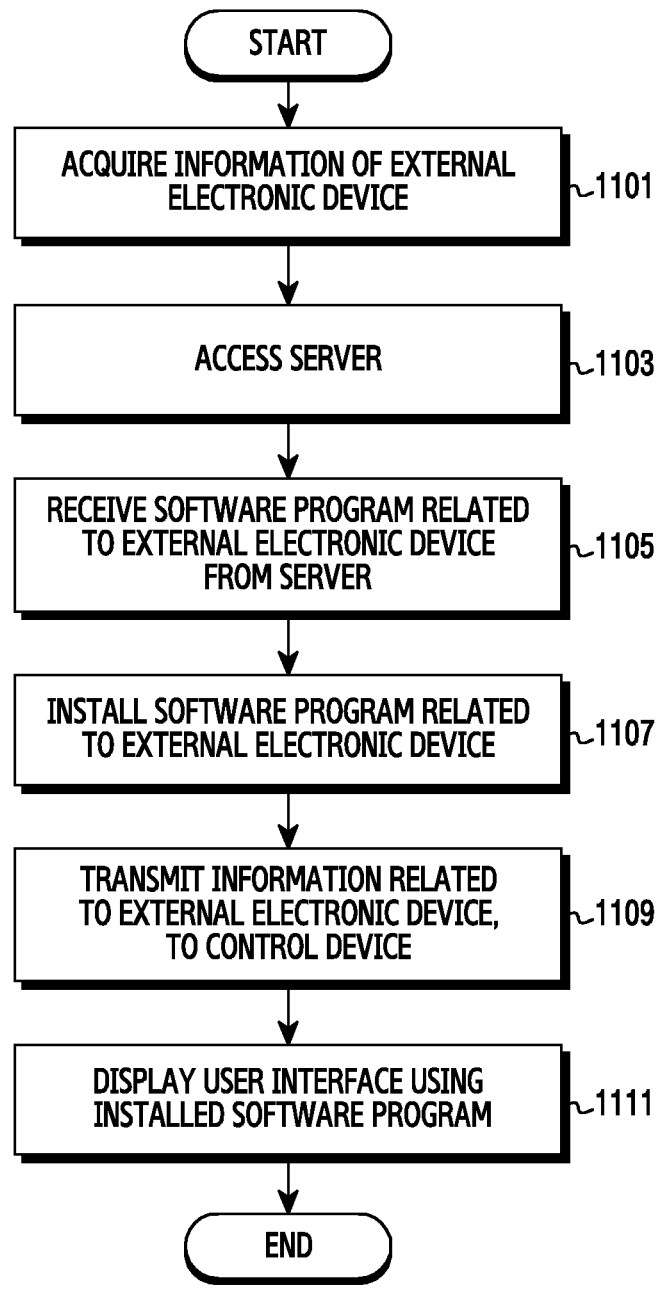
FIG. 11 is a flowchart illustrating a method of operating an electronic device for providing a user interface in connecting an IoT device to a control device, according to an embodiment of the present disclosure.

Referring to FIG. 10B and FIG. 11, at operation 1101, the mobile device 1000 may acquire information on the IoT device, i.e., the smart electric light 1020. For example, the mobile device 1000 may acquire information on the IoT device 1020 (e.g., identification information of the smart electric light 1020) using at least one of a code or a tag attached to or provided along with the smart electric light 1020. Such code or tag provided along with the smart electric light 1020 may be, for example, in a manual or user guide, or located inside or on a box or packaging of the smart electric light 1020.

Referring to FIG. 10B, the mobile device 1000 may acquire information 1032 on the smart electric light 1020. For example, the mobile device 1000 may acquire information on the smart electric light 1020 by recognizing a QR code 1030 attached to the smart electric light 1020, with a built-in camera.

In another embodiment, the code or tag attached to or provided along with the smart electric light 1020 (for example, included within a manual), or attached to packaging of the IoT device 1020 may be, for example, a bar code. In yet another embodiment, the mobile device 1000 may also identify the smart electric light 1020 by performing an augmented reality mechanism or 3-Dimensional (3D) recognition scheme, using at least one of a camera built in the mobile device 1000, a wearable device, or smart glasses.

In yet another alternative, the mobile device 1000 may acquire the information on the smart electric light 1020, using the code or tag attached to or provided along with the smart electric light 1020, or attached to packaging of the smart electric light 1020, in combination of (1) the augmented reality mechanism or 3D recognition scheme.

In another embodiment, the mobile device 1000 may acquire the information on the smart electric light 1020 (e.g., identification information of the IoT device 1020) using one or more RFIDs. In yet another embodiment, the mobile device 1000 may acquire the information on the smart electric light 1020 from an NFC tag or BLE tag attached to the smart electric light 1020. In yet another embodiment, the mobile device 1000 may acquire information on a single IoT device or information on a set or group of IoT devices, from a single code or tag.

Figure 10C:
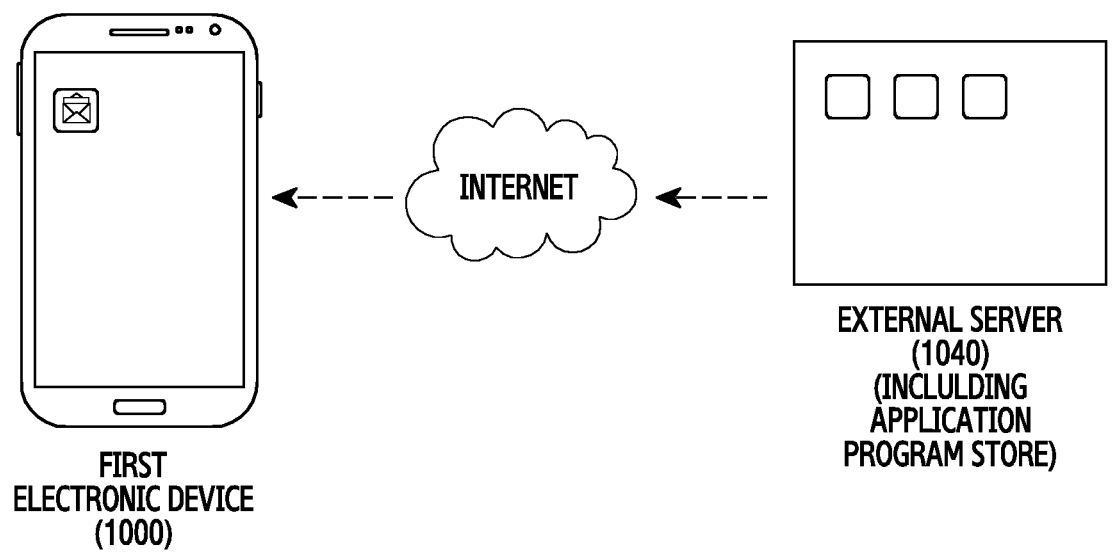

(2) Download and Installation of an IoT Device Related Software on a Mobile Device Referring to FIGS. 10C and 11, at operation 1103, the mobile device 1000 may access a server 1040 (e.g., the server 706 or 1040) including an application program store.

Thereafter, at operation 1105, the mobile device 1000 may receive or download a software program related to the IoT device 1020 from the server. For example, the mobile device 1000 may transmit identification information of the smart electric light 1020 to the server, and then receive a corresponding software program related to the smart electric light 1020 from the server.

At operation 1107, the mobile device 1000 may install the software program related to the IoT device 1020, received from the server. For example, referring to FIG. 10C, the mobile device 1000 may access an external server 1040 including an application program store (e.g., Google Play® or Apple App Store), and receive at least a portion of a software program related to the smart electric light 1020 from the external sever 1040. Thereafter, the mobile device 1000 may install the received portion of the software program.

In one embodiment, the mobile device 1000 may receive and install at least a portion of a software program for a user interface of the smart electric light 1020. In another embodiment, the mobile device 1000 may receive and install at least a portion of a software program for a user interface for the smart electric light 1020 and at least a portion of a software program for control of the smart electric light 1020 to be used by an IoT control device. In this case, the portion of the software program for control of the smart electric light 1020 may be temporarily stored in the mobile device 1000, and then, be transmitted to the IoT control device 1010 (as will be described below) and then, be removed from the mobile device 1000.

In yet another embodiment, the mobile device 1000 may (1) receive and install the software program for the user interface of the smart electric light 1020, and (2) receive only the identification information of the smart electric light 1020 in place of the software program for control of the smart electric light 1020. In this case, the identification information of the smart electric light 1020 may be transmitted to the IoT control device 1010, as will be described in more detail below.

In yet another embodiment, a user may identify and select a required application program from an app store (for example, Google Play® or Apple App Store), based on the name of the IoT device and/or a category thereof, and then download and install the identified application program onto the mobile device 1000. In one embodiment, the app store may provide apps for IoT devices by category.

Figure 12:
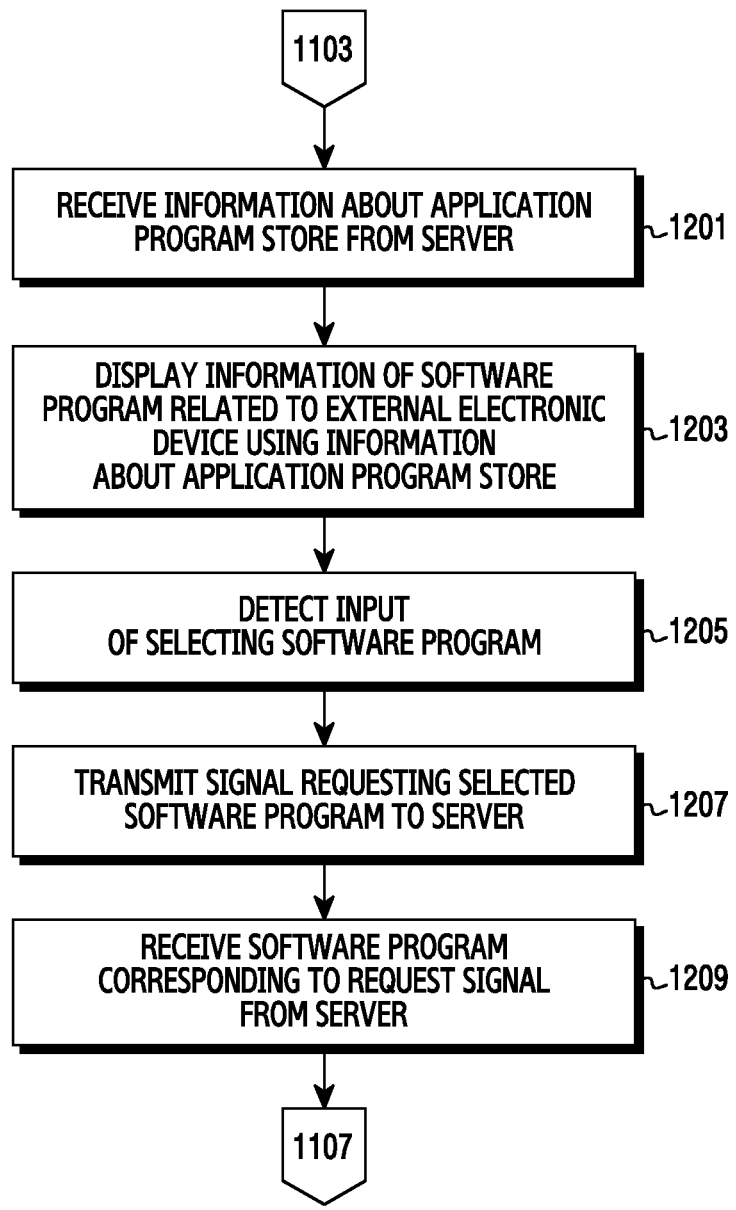
FIG. 12 is a flowchart illustrating another embodiment of a method of receiving a software program related to an external device as part of the flowchart of FIG. 11.

Referring to FIG. 12, another embodiment of a method using operations in lieu of the operations 1101 to 1105 of FIG. 11 is described below.

Referring to FIG. 12, when accessing the server (e.g., the server 706 or 1040) in the operation 1103 of FIG. 11, the mobile device 1000 can receive information on an application program store from the server 1040 at operation 1201.

At operation 1203, the mobile device 1000 may display, on a display screen (e.g., the display 760) thereof, information on a software program related to the smart electric light 1020, using the received information on the application program store.

Figure 13:
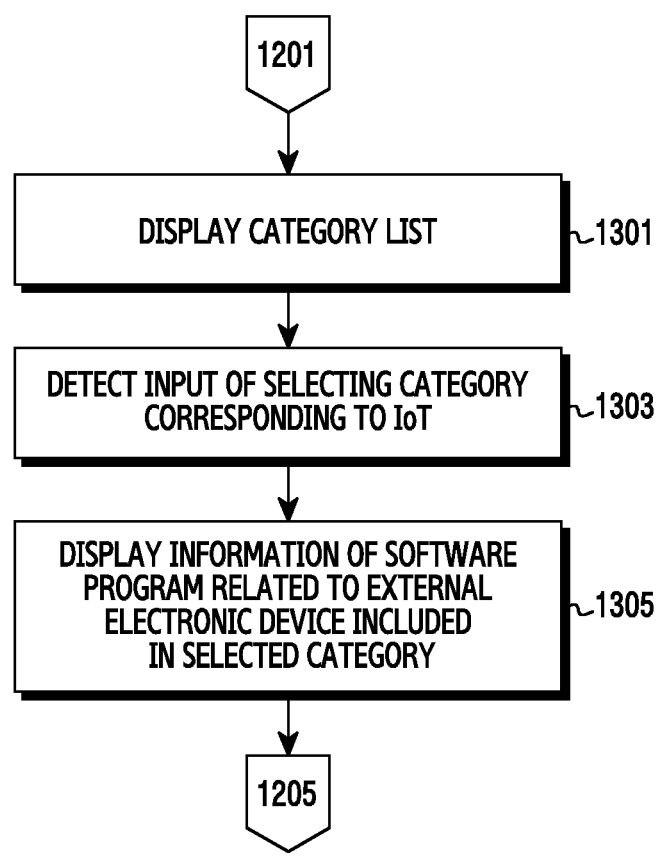
FIG. 13 is a flowchart illustrating another embodiment of a method for displaying information on a software program related to an external device as part of the flowchart of FIG. 12.
Figure 14A:
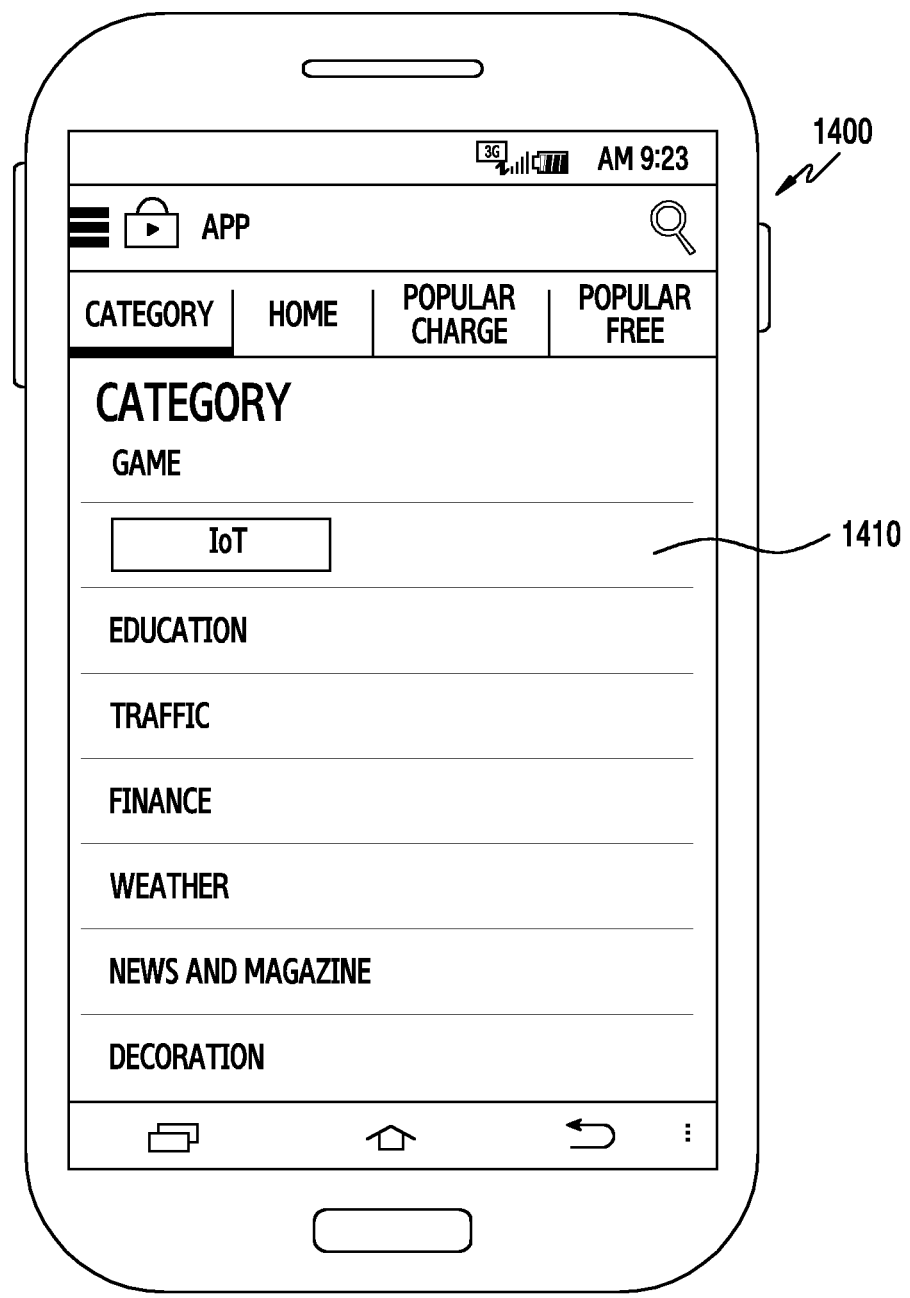
FIGS. 14A and 14B illustrate examples of screen displays of an application program store for an IoT device, according to an embodiment of the present disclosure.
Figure 14B:
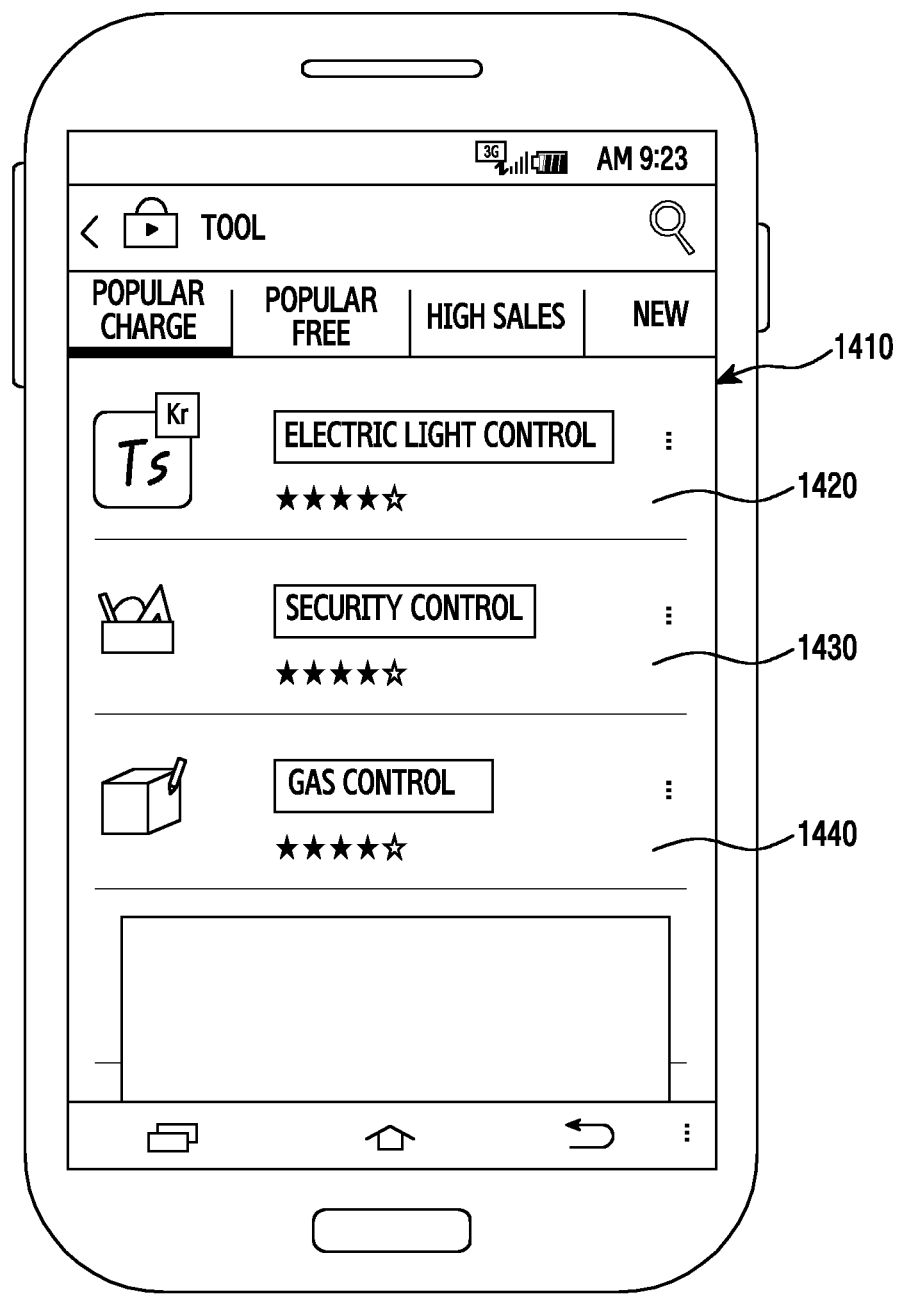

Referring to FIG. 13 and FIGS. 14A and 14B, one embodiment of implementation details of operation 1203 of FIG. 12 is described below. Referring to FIG. 13, after receiving the information on the application program store from the server at operation 1201 of FIG. 12, the mobile device 1000 may, at operation 1301, show a category list included in the application program store on the display (e.g., the display 760). For example, as illustrated in FIG. 14A, the mobile device 1000 may display, on the display, a category list 1400, such as game, IoT 1410, education, traffic, finance, weather, news and magazine, decoration or the like included in the application program store.

At operation 1303, the mobile device 1000 may receive a user's input for selection of a category corresponding to the IoT among the category list displayed on the display. For example, referring again to FIG. 14A, the mobile device 1000 may receive selection of the IoT category 1410 from the category list 1400 shown on the display.

At operation 1305, in response to the selection of the category corresponding to the IoT, the mobile device 1000 may display on the display a list of IoT-related software programs. The list can also include information on the software programs associated with various external electronic devices. In one embodiment, as shown in FIG. 14B, the mobile device 1000 may display, on its display, a list of software programs, such as an electric light control app 1420, a security control app 1430, a gas control app 1440 or the like in the IoT category 1410.

At operation 1205 of FIG. 12, the mobile device 1000 may receive an input of selection of the software program related to the external electronic device (e.g., smart electric light 1020) displayed on the display. At operation 1207, in response to the selection, the mobile device 1000 may transmit a signal requesting for the software program related to the external electronic device (e.g., smart electric light 1020), to the server 1040. At operation 1209, as a response to the request signal, the mobile device 1000 may receive the software program related to the external electronic device (e.g., smart electric light 1020) from the server 1040.

Figure 10D:
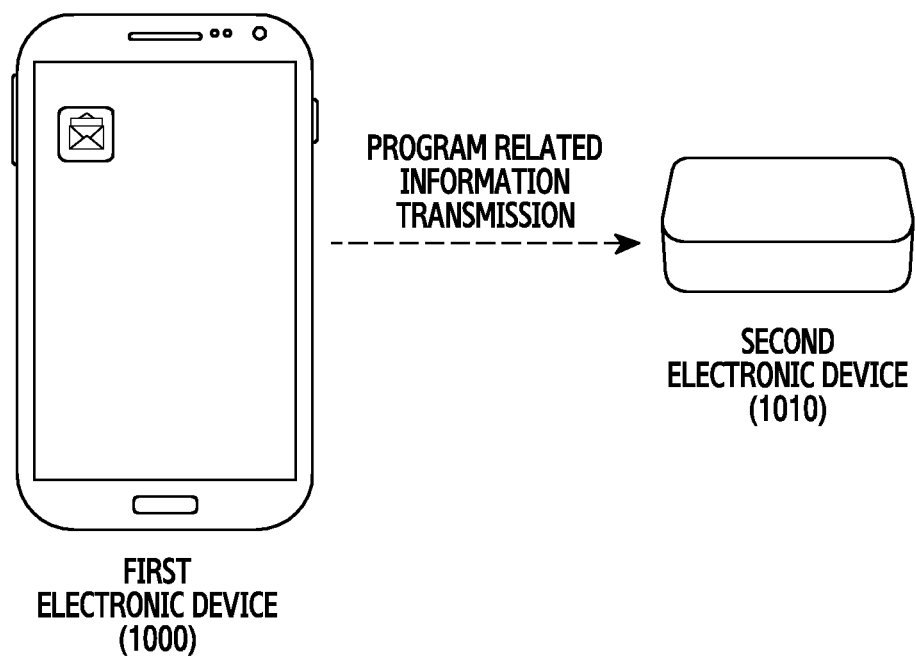

(3) Download and Installation of an IoT Device-Related Software on an IoT Control Device Referring to FIGS. 10D and 11, at operation 1109, the mobile device 1000 may transmit information related to the IoT device 1020, to a control device (e.g., the control device 702 or the IoT control device 1010). In one embodiment, the mobile device 1000 may transmit, to the control device, identification information of the IoT device or identification information of the software program related to the IoT device. In another embodiment, the mobile device 1000 may transmit, to the control device, at least a portion of the software program received from the server in relation to the IoT device. In such an embodiment, the mobile device 1000 may delete or remove the at least a portion of the software program (for example, a control-related portion of the software program) after transmitting the portion to the control device. In yet another embodiment, the mobile device 1000 may transmit an identifier of the software program received from the server in relation to the IoT device, to the control device.

Referring to FIG. 10D, for example, the mobile device 1000 may transmit information related to the smart electric light 1020, to the IoT control device 1010. For example, the mobile device 1000 may transmit identification information of the smart electric light 1020 or identification information of a software program related to the smart electric light 1020 (e.g., identification information of a software program for control), to the IoT control device 1010. In another embodiment, the mobile device 1000 may transmit at least a portion of the software program that was received in relation to the smart electric light 1020 at operation 1105 (for example, a control-related portion of the program), to the IoT control device 1010. Further, the mobile device 1000 may then delete the at least a portion of the software program transmitted to the IoT control device 1010 (for example, a control-related portion of the program).

In yet another embodiment, the mobile device 1000 may transmit an identifier of the software program that was received in relation to the smart electric light 1020 at operation 1105, to the IoT control device 1010. Thereafter, the IoT control device 1010, for example, can retrieve the software program using the received identifier.

Figure 10E:
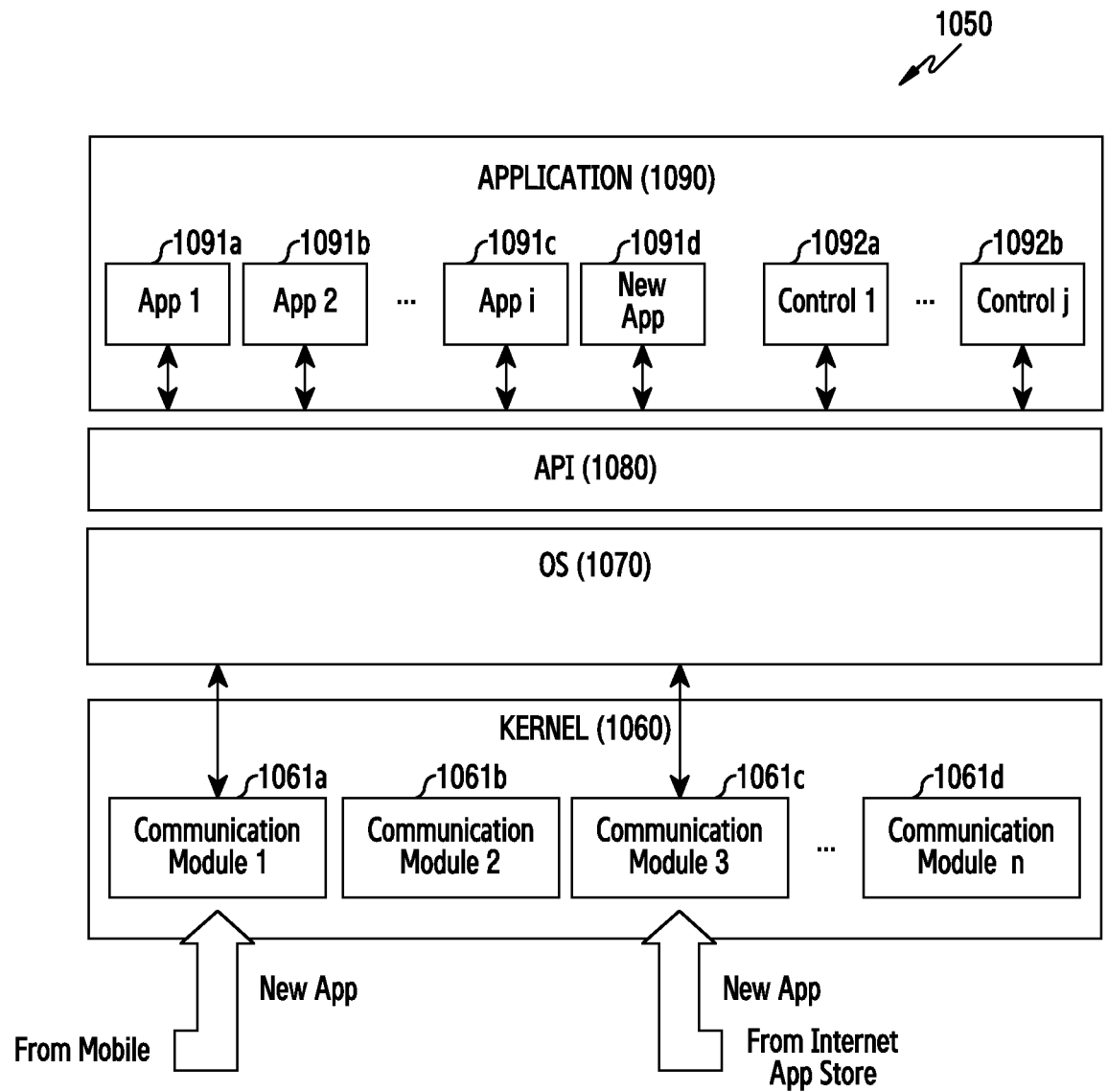

Referring to FIG. 10E, the IoT control device 1010 may install a software program 1091*d* for controlling the smart electric light 1020 at the application layer 1090 of the program module 1050, based on the information related to the smart electric light 1020 or the at least a portion of the software program received from the mobile device 1000.

In one embodiment, the IoT control device 1010 may receive a software program related to the smart electric light 1020 from the mobile device 1000 through the communication module 1 1061*a* of the kernel 1060, and install the received software program on the application layer 1090. In another embodiment, the IoT control device 1010 may receive a software program related to the smart electric light 1020 from an application program store through the communication module 3 1061*c* of the kernel 1060, and install the received software program on the application layer 1090.

In yet another embodiment, the IoT control device 1010 may preload or download, and install a generic application program (e.g., 1091*a*) (for example, a software module capable of using a specific communication protocol). Using such a generic application program, the IoT control device 1010 may provide software functionalities for a new IoT device by simply registering the new IoT device with the generic application program on the basis of information or message for the IoT device received from the mobile device 1000 (instead of installing new software programs for respective new IoT devices).

In yet another embodiment, the IoT control device 1010 may, in advance, preload or download and then install a default control software (e.g., 1092*a*), which can be used for a specific IoT device or a plurality of different kinds or brands of IoT devices. In this case, by simply registering a new IoT device with the default control software, based on information or a message received from the mobile device 1000, as described above, the IoT control device 1010 may communicate with the new IoT device.

As described above, after a software or control module for control of the smart electric light 1020 is installed on the IoT control device 1010, using the mobile device 1000, the IoT control device 1010 may thereafter control the smart electric light 1020 as needed. For example, the IoT control device 1010 and the smart electric light 1020 may exchange a control signal(s) for controls and status checks with each other.

In certain embodiments, at least some of the IoT device-related software programs installed on the mobile device 1000 and/or the IoT control device 1010 may be continually updated in synchronization with an app store providing the programs or the website of the manufacturer of the IoT device.

(4) Provision of an IoT Device-Related User Interface on a Mobile Device

Figure 10F:
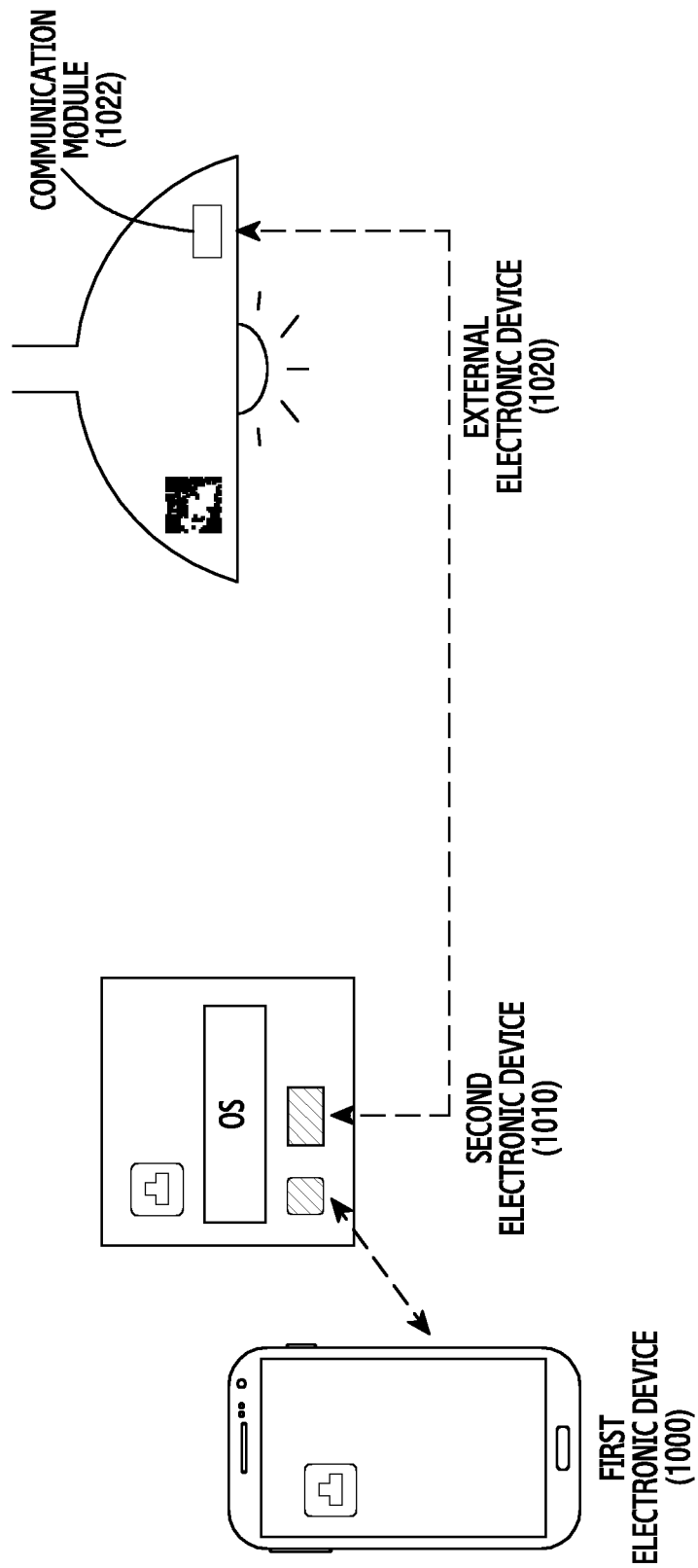

Referring to FIG. 10F and FIG. 11, at operation 1111, the mobile device 1000 may display, on the display (e.g., the display 760), a user interface related to the IoT device 1020, using a software program related to the IoT device 1020 installed on the IoT control device 1010. Accordingly, a user can control the smart electric light 1020, via the IoT control device 1010, through the user interface displayed on the mobile device 1000. As illustrated in FIG. 10F, the IoT control device 1010 can send control commands to the smart electric light 1020, through the communication module 1022 of the smart electric light 1020.

Although FIGS. 10A to 14B have been described above with reference to a first electronic device 1000 being a mobile device, and an IoT device 1020 being a smart electric light, the above-described embodiments are not limited to these examples. For example, the first electronic device 1000 could be a smart watch or TV, and the IoT device could be a dishwasher or clothes dryer.

Figure 15:
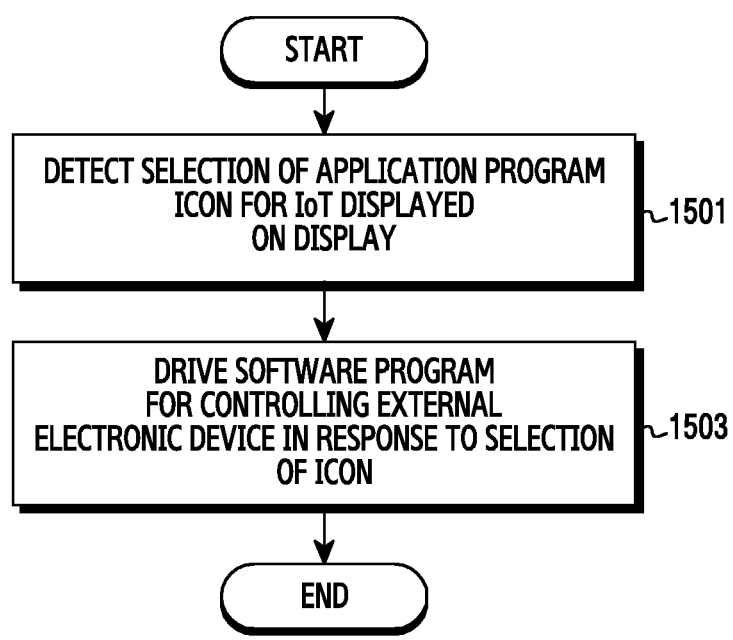
FIG. 15 is a flowchart illustrating a method of controlling an IoT device, according to an embodiment of the present disclosure.
Figure 16B:
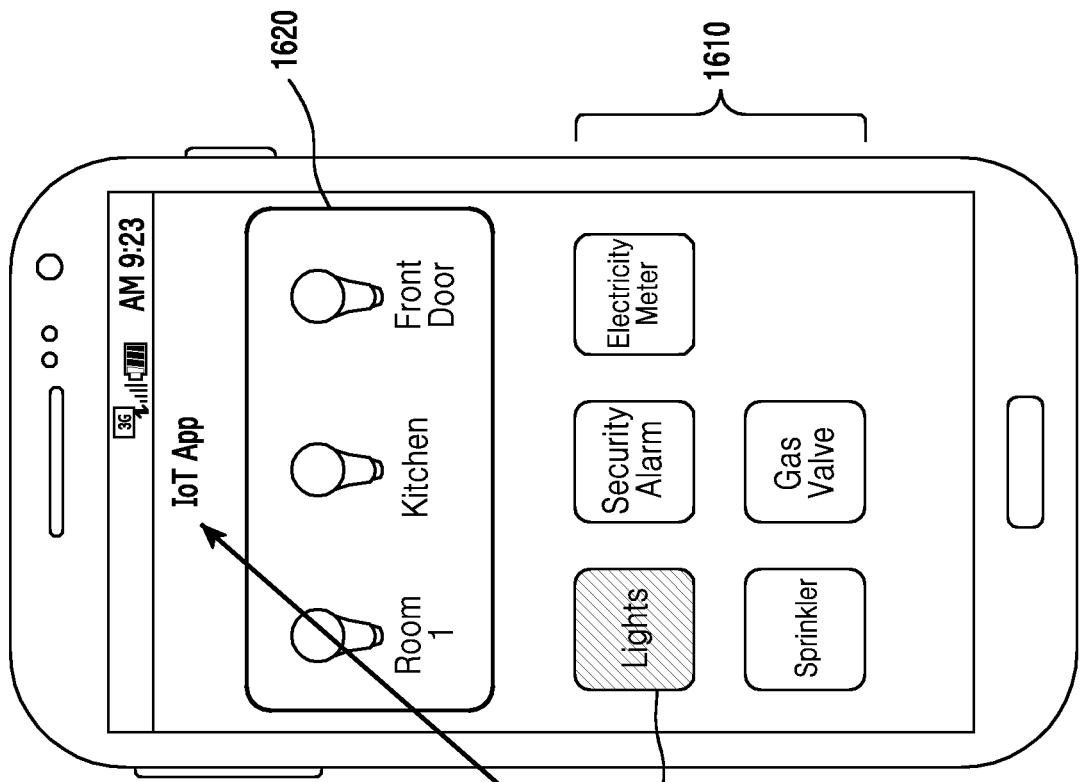
FIGS. 16A and 16B illustrate a user interface for controlling IoT devices, according to an embodiment of the present disclosure.
Figure 16A:
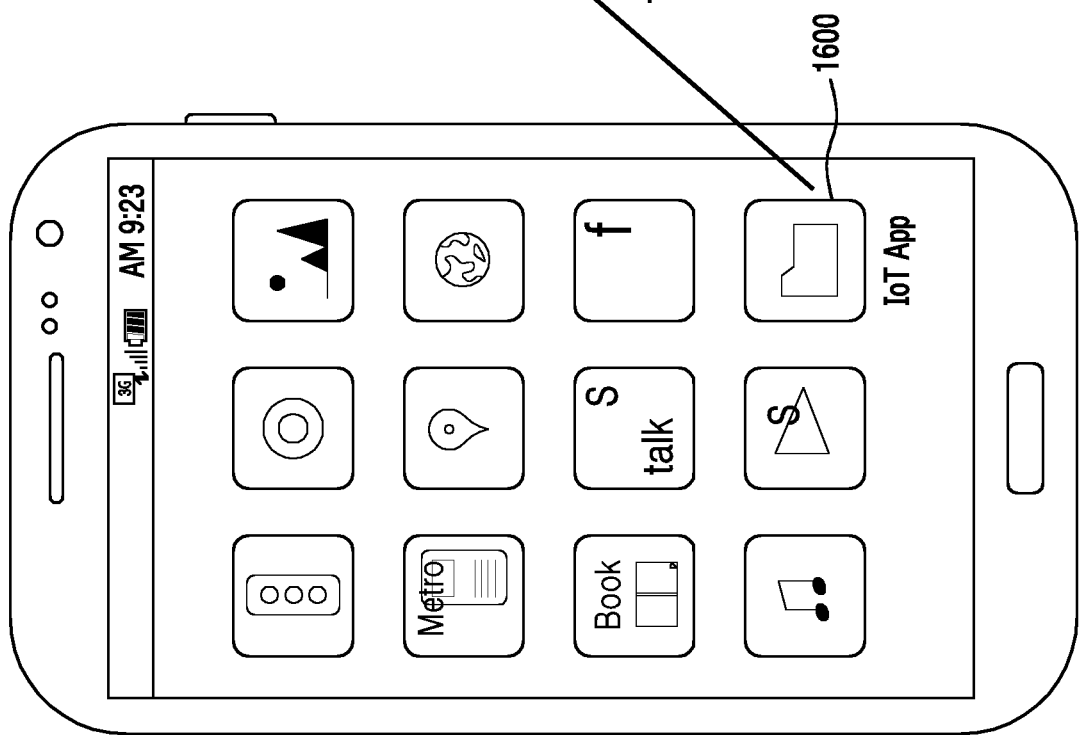

Referring to FIG. 15 and FIGS. 16A and 16B, one embodiment of a method of running a software program dedicated for an IoT device on a mobile device will be described below. Referring to FIG. 15, at operation 1501, a mobile device (e.g., the electronic device 700 or the mobile device 1000) may receive, from a user, a selection of an icon for an application program for an IoT displayed on a display (e.g., the display 760). As illustrated in FIG. 16A, the mobile device may display icons representing various kinds of application programs on the display. Among these icons, an icon of an application program (e.g., an IoT App 1600) dedicated for controlling IoT devices is displayed at the bottom right side.

At operation 1503, in response to the selection of the icon of the application program for the IoT, the mobile device may open the application program for the IoT. When the application program is run, as illustrated in FIG. 16B, a user interface may be displayed. The user interface may display a list of IoT devices controllable by the mobile device, e.g., in the form of an icon, an image, and/or a text. As illustrated in FIG. 16B, the mobile device may display, on the display, previously installed IoT devices, such as a lighting system 1612, a security alarm system, an electricity meter, a sprinkler system, and a gas valve meter that can be controlled through the mobile device. When the icon for the lighting system 1612 is selected, the mobile device may display a detailed menu 1620 for control of an electric light.

Figure 17:
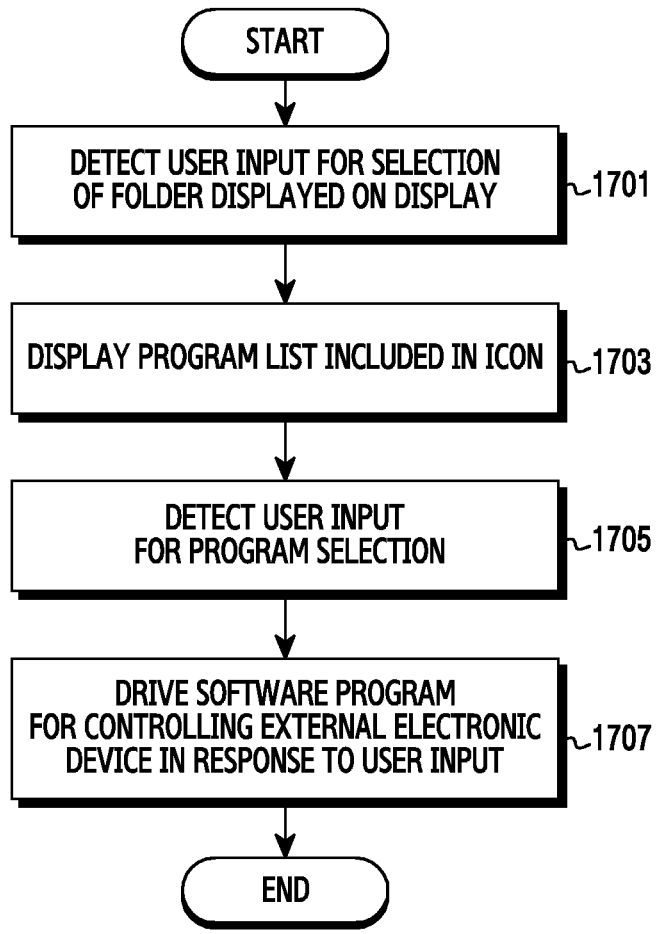
FIG. 17 is a flowchart illustrating a method of controlling an IoT device, according to another embodiment of the present disclosure.
Figure 18B:
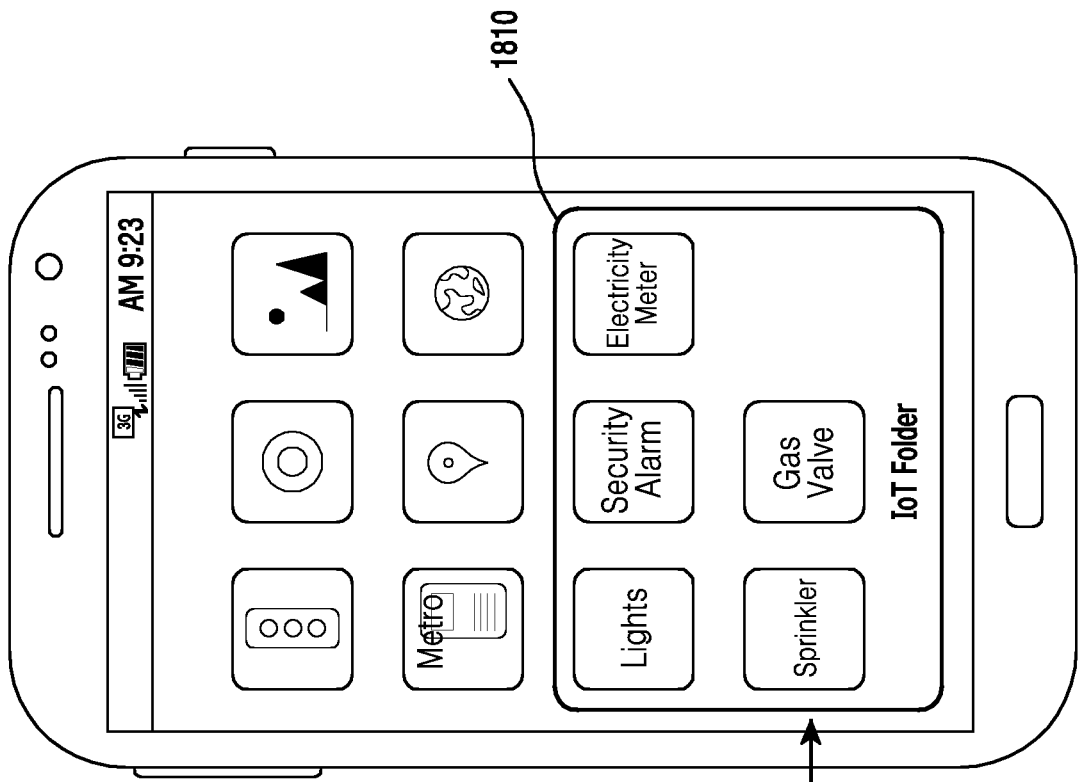
FIGS. 18A and 18B illustrate a user interface for controlling IoT devices, according to another embodiment of the present disclosure.
Figure 18A:
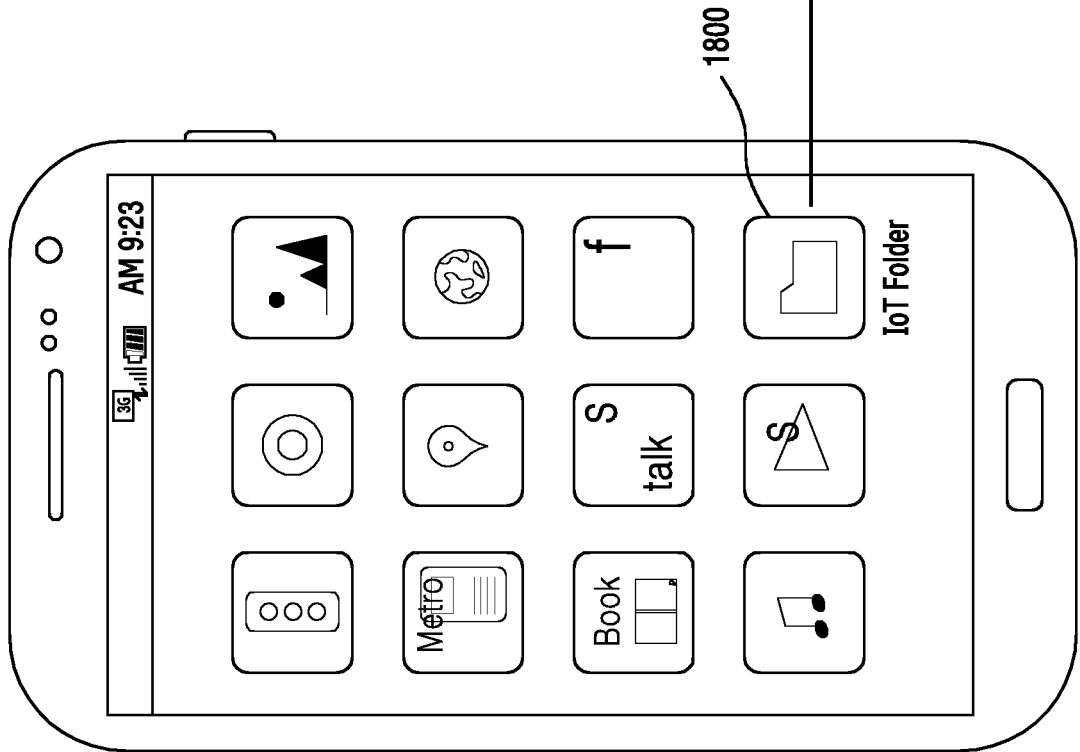

Referring to FIG. 17 and FIGS. 18A and 18B, another embodiment of a method of executing application programs for an IoT device on a mobile device will be described below.

Referring to FIG. 17, at operation 1701, a mobile device (e.g., the electronic device 700 or the mobile device 1000) may receive, from a user, a selection of a folder (e.g., an IoT folder 1800) displayed on a display (e.g., the display 760). The folder can include icons for application programs associated with IoT devices.

At operation 1703, in response to the selection of the IoT folder 1800, the mobile device may display icons of the application programs for the IoT device already installed in the mobile device within an extension region 1810 of the folder 1800. For example, as illustrated in FIG. 18B, the mobile device may display icons of a lighting system application, a security alarm system application, an electricity meter application, a sprinkler system application, and a gas valve meter application, on the display.

At operation 1705, the mobile device may receive a selection, from a user, of an application program for a specific IoT device among the application programs. At operation 1707, in response to the selection of the application program, the mobile device may execute the selected application program. For example, the mobile device may execute the selected application program, and display a user interface for controlling the corresponding IoT device.

In certain embodiments, to recognize an IoT device and connect the IoT device with an IoT control device, a mobile device may use at least one of an RFID, a GPS, an electromagnetic position indicator, an accelerometer, or other environment information. In another embodiment, when the IoT device does not include a communication module, the IoT device may be controlled using an aftermarket device that is configured to connect the IoT device to an alternating current (AC) outlet.

In accordance with various embodiments of the present disclosure, the mobile device may add or connect a new IoT device to the IoT control device with various methods.

Scenario 1: Adding a New IoT Device to an Already Installed IoT Control Device

In one embodiment, a mobile device that serve as a user interface may identify a new IoT device with, for example, an NFC tag, an RFID, augmented reality, a QR code, a barcode, or a combination of two or more of the foregoing. Then, the mobile device may receive or download, and install a software program related to the IoT device (or only a user interface-related portion of the program). Thereafter, the mobile device may transmit information on the software program related to the IoT device (e.g., identification information of the IoT device or identification information of the software program related to the IoT device), to an IoT control device. The IoT control device may receive or download, and install at least a portion of the software program related to the IoT device (e.g., a control-related portion of the program) based on the information on the software program related to the IoT device.

When the IoT device is activated, and the IoT control device receives a signal from the IoT device, the IoT control device may complete registration of the IoT device, and starts monitoring the IoT device. The IoT control device may transmit registration completion information to the mobile device.

When the IoT control device fails to receive a signal from the IoT device, the IoT control device may wait for a signal from the IoT device for a selected period of time (for example, one or two days). The IoT control device may delete a software program related to the IoT device if there is no signal within the selected period of time. Alternatively, the control device may delete a software program related to the IoT device, in response to the user's selection. The IoT control device may determine the location of at least one IoT device, with reference to the location of the IoT control device as in the embodiments that will be described below.

Scenario 2: Replacing an Existing IoT Control Device (i.e., the Existing Control Device), which is Already Connected to IoT Devices, with a New IoT Control Device (i.e., a New Control Device)

In one embodiment, an existing IoT control device may collect information on the already installed IoT devices (e.g., identification information for all the IoT devices or identification information of software programs related to the IoT devices) and store the collected information in a server (e.g., a cloud server) or a mobile device. Thereafter, when the existing IoT control device is replaced with a new IoT control device, the previously stored information on the IoT devices may be provided from the server or mobile device to the new IoT control device, and the new IoT control device may be connected to the existing IoT devices. In another embodiment, even when the existing IoT control device is reset or changed, the previously stored information of the IoT device may be provided from the server or mobile device back to the existing IoT control device.

Scenario 3: First Installing a Set of IoT Devices with an IoT Control Device

In one embodiment, an IoT control device can install related software for a set of new IoT devices, using identifiers (for example, a bar code) from the packaging or package of the set of IoT devices, as described above. Then, the IoT control device may be connected to the set of IoT devices. For example, the IoT control device may receive a package of software programs for a plurality of IoT devices from a server, and install the received package of the software programs.

Scenario 4: Connecting a New Mobile Device to a Network Including an IoT Control Device In one embodiment, an IoT control device may be connected to a new mobile device that serves as a user interface. In this case, the IoT control device may provide information to the mobile device such that the mobile device may download and install software for an IoT user interface from an app Store or the IoT control device. The IoT control device may transmit information of at least one IoT device that can be controlled by the IoT control device (e.g., identification information of the IoT device or identification information of a software program related to the IoT device), to the new mobile device.

Process of Providing Location Information about an IoT Device to an IoT Control Device In certain embodiment, an IoT control device may need location information of IoT devices for controlling the IoT devices. For example, when a plurality of indoor lighting devices (e.g., smart electric lights) are connected to an IoT control device, and transmit and receive the same signals inside a building, the IoT control device may need location information of the lighting devices in order to control specific ones of the lighting devices at a time.

However, the IoT control device or a mobile device may not have location information of a low-end IoT device. Further, although a high-end IP-based IoT device is connected to the IoT control device, its physical location may not be obtained easily. Further, when there are a plurality of the same or similar IoT devices, there may be a need to provide location information of the IoT devices to the IoT control device or users of the IoT devices.

In one embodiment, at the operation described with reference to FIG. 10, when capturing a QR code (or a bar code) associated with an IoT device to identify the IoT device, a mobile device may determine the location of the IoT device. For example, at the time of recognizing the IoT device, the mobile device may determine the location of the mobile device, e.g., using a GPS, an indoor location check mechanism, etc., included in the mobile device. Then, the mobile device can record and regard the determined location as the location of the IoT device. In another embodiment, the mobile device may determine the relative direction of the IoT device with respect to the mobile device, using a Multiple Input Multiple Output (MIMO) mechanism of the mobile device.

In another embodiment, when there is a need for accurate location information of the IoT device, the mobile device may determine, estimate, or derive a more accurate location of the IoT device than in the above embodiment, by comparing the size of a QR code or barcode captured for IoT device recognition and the original size of a preset QR code or barcode. In this case, the mobile device may estimate a more accurate location of the IoT device by further using at least one of (a) directions (i.e., South, North or the like) detected by a compass of the mobile device, (b) a location of the mobile device, or (c) the orientation (e.g., one detected by a gyro-sensor or acceleration sensor) of the mobile device.

In yet another embodiment, an IoT control device may selectively provide a signal(s) to at least one of a plurality of IoT devices positioned at different locations, based on location information of the IoT devices. Such an IoT control device may use, for example, a directional antenna or beamforming technology. The IoT control device may provide signals to selected IoT devices at a time, while having no influence on the other IoT devices.

In other embodiments, the mobile device may determine a location of an IoT device, using at least one of WiFi SLAM (simultaneous localization and mapping), location measurement techniques using LPPe2.0, or a localization technology disclosed in Korean Patent Laid-Open Publication No. 10-2013-0038757, the disclosure of which is incorporated herein by reference.

In one embodiment, when using the SLAM, a mobile device may have a localization function of receiving an input of 2-Dimensional (2D) data (image) while making a 3D map, and determining even its own location. For example, the SLAM may provide a service in which a robot vacuum cleaner with a camera moves throughout the entire house, while making a map for the robot vacuum cleaner to determine where it is located on the map. For example, the SLAM may provide a service of creating a 3D map of a space through an input from a camera included in a mobile device, and determine the location of the camera (i.e., a mobile device including the camera) on the 3D map, and the direction in which the camera faces.

When using the WiFi SLAM, the mobile device may have a localization function of making a 3D map by a WiFi signal and determine a current location of the mobile device, similar to the principles of the SLAM. Accordingly, when the mobile device using the WiFi SLAM moves in a space in which an access point (AP) is installed, the mobile device may receive unique information (i.e., a fingerprint) formed from a WiFi signal, and make a map of the space, and then estimate a location of the mobile device. Based on this scheme, the mobile device may determine location information of IoT devices.

In one embodiment, when using the WiFi SLAM, a mobile device and an IoT device supporting WiFi may measure respective locations, using WiFi unique information (i.e., a fingerprint). In this case, the IoT device may determine the relative distance and direction with respect to the mobile device.

In another embodiment, to improve indoor positioning performance based on the LPPe2.0 technology, at least one of the following methods can be used: a radio characteristic information method, an Image Recognition Based (IRB) method, a Pedestrian Dead Reckoning (PDR) method, a method by UE-assisted motion sub-state, map-based attributes, a UE's own crowd sourcing support for location and measurement information, indoor/outdoor transit area information, radio map data, UE-based IRB positioning, or improved WLAN positioning information provision. Such methods may be used to acquire location information of the IoT devices through the mobile device.

In one embodiment, a mobile device may detect a relative distance of movement and direction of an IoT device from a first location of the mobile device. Such a scheme can be implemented, using a distance between a location of the mobile device and a location of the IoT device estimated with a pedometer/accelerometer sensor (for example, when a user approaches on foot the IoT device with the mobile device at hand).

In another embodiment, when using the technologies of Korean Patent Laid-Open No. 10-2013-0038757, a mobile device may determine a distance and direction with respect to an IoT device, using coordinate and direction information of the mobile device estimated through measurement (e.g., a depth camera or a depth sensor) of direction and other distances of the mobile device.

In yet another embodiment, by installing a fixed camera and installing a marker at a selected interval, a mobile device may identify in advance a coordinate of each location corresponding to each pixel of an image. Then, by checking whether a specific object (e.g., an IoT device) exists at any location on an image and estimating a coordinate of the object in the space, the mobile device may estimate the location of an IoT device.

Figure 19:
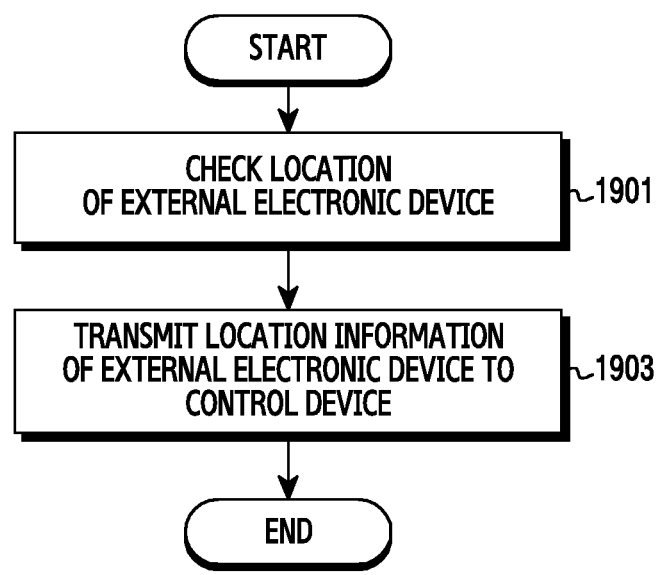
FIG. 19 is a flowchart illustrating a method of providing a location of an IoT device to a control device of the IoT device, according to an embodiment of the present disclosure.
Figure 20:
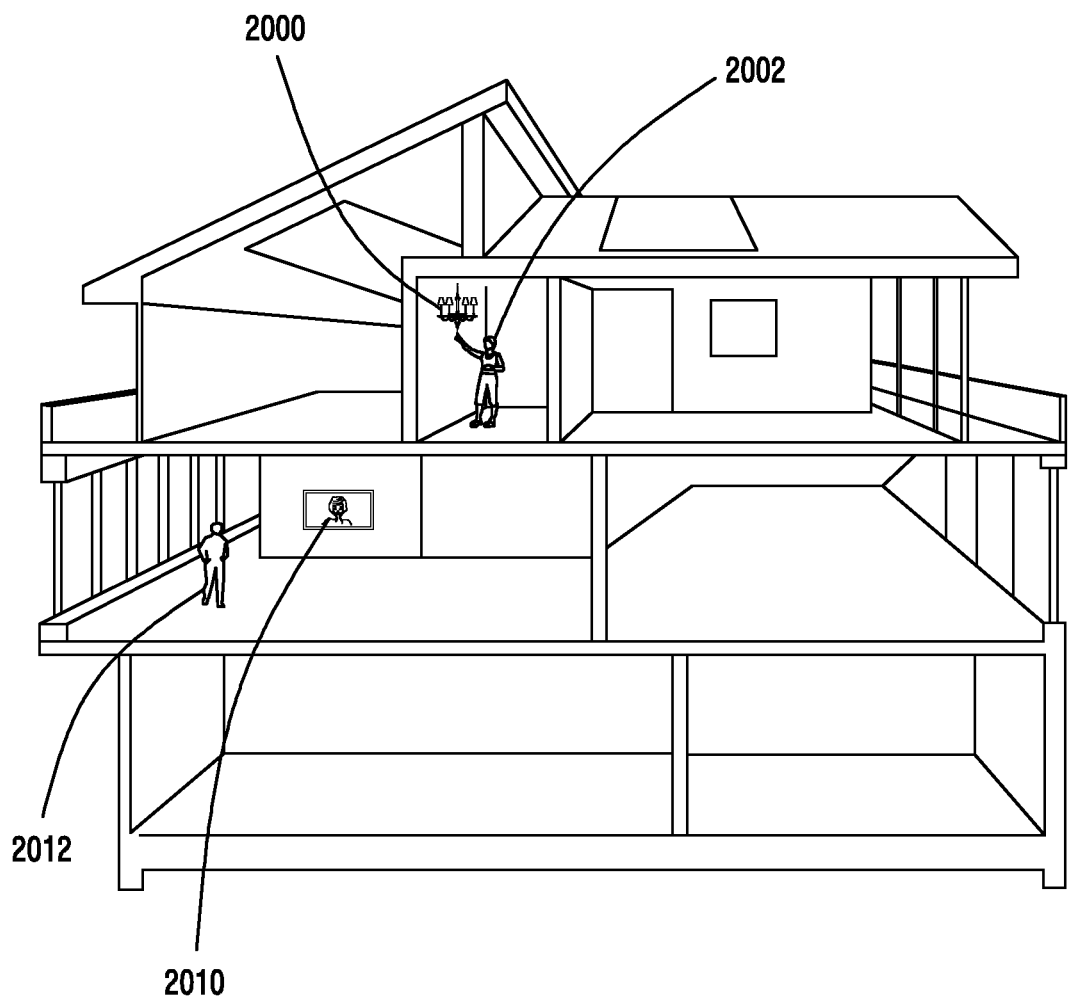
FIG. 20 illustrates a scenario for providing a location of an IoT device to a control device of the IoT device, according to an embodiment of the present disclosure.

FIG. 19 is a flowchart illustrating a method of providing a location of an IoT device to a control device of the IoT device, according to one embodiment. The embodiment below can be used for determining a location of an IoT device in a situation, as illustrated in FIG. 20.

Referring to FIG. 19, at operation 1901, an electronic device (e.g., the electronic device 700 or the mobile device 1000) may determine a location of an external electronic device. For example, as shown in FIG. 20, when the electronic device (for example, an electronic device 2002) is close to the external electronic device (for example, an electric light 2000) to be controlled through the IoT, and acquires information of the electric light 2000, the location of the electronic device 2002 may be used as the location of the electric light 2000. In another embodiment, in FIG. 20, the electronic device 2002 may estimate the location of a TV 2010 to be controlled through the IoT scheme, using localization technologies of SLAM, LPPe2.0, etc. At operation 1903, the electronic device may transmit the location information of the external electronic device to a control device (e.g., the control device 702 or the IoT control device 1010).

Figure 21:
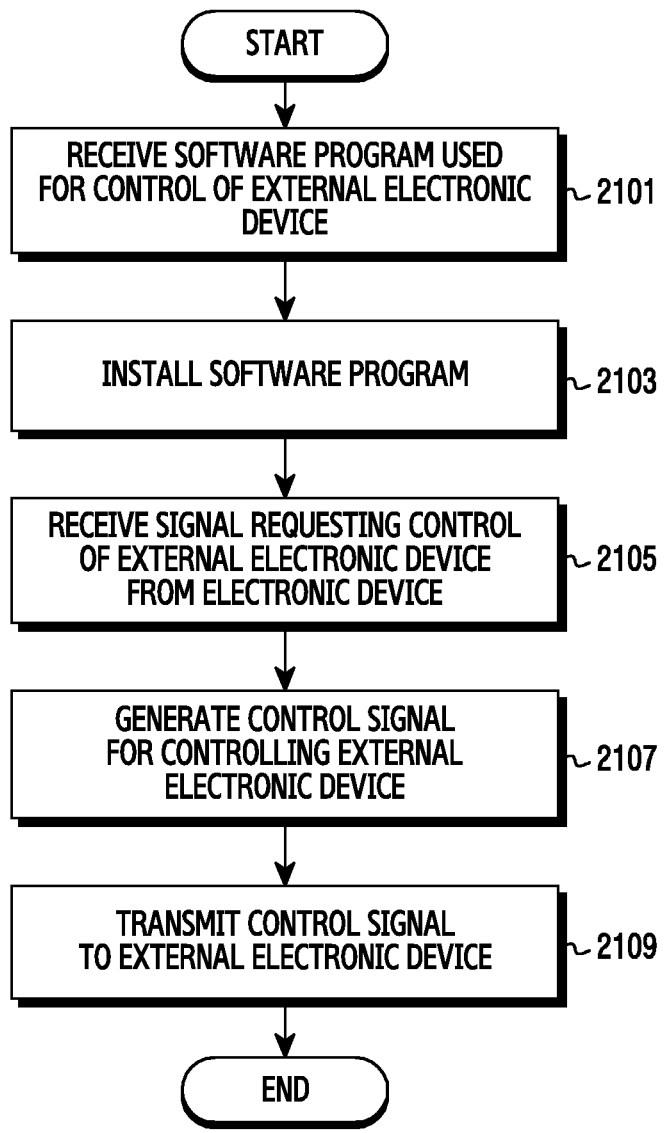
FIG. 21 is a flowchart illustrating a method of operating an IoT control device, according to an embodiment of the present disclosure.

FIG. 21 is a flowchart illustrating a method of operating an IoT control device, according to one embodiment. Referring to FIG. 21, at operation 2101, the IoT control device (e.g., the control device 702 or the IoT control device 1010) may receive a software program used for controlling an IoT device (e.g., the smart electric light 1020). In one embodiment, the control device may receive a software program used for control of the external electronic device from a server (e.g., the server 464 or 1040), using identification information of the IoT device or identification information of a software program corresponding to the IoT device, either of which has been received from an electronic device (e.g., the electronic device 700 or the mobile device 1000). In another embodiment, the IoT control device may receive the software program used for controlling the IoT device from the electronic device.

At operation 2103, the IoT control device may install the received software program for controlling the IoT device. At operation 2105, the IoT control device receives a signal requesting for control of the IoT device, from the electronic device. At operation 2107, in response to the signal requesting for control of the IoT device, the IoT control device may generate a control signal for controlling the IoT device. For example, the IoT control device may convert the control signal received from the electronic device into a control signal corresponding to a scheme for communication with the IoT device. At operation 2109, the IoT control device may transmit the converted control signal to the IoT device.

Figure 22:
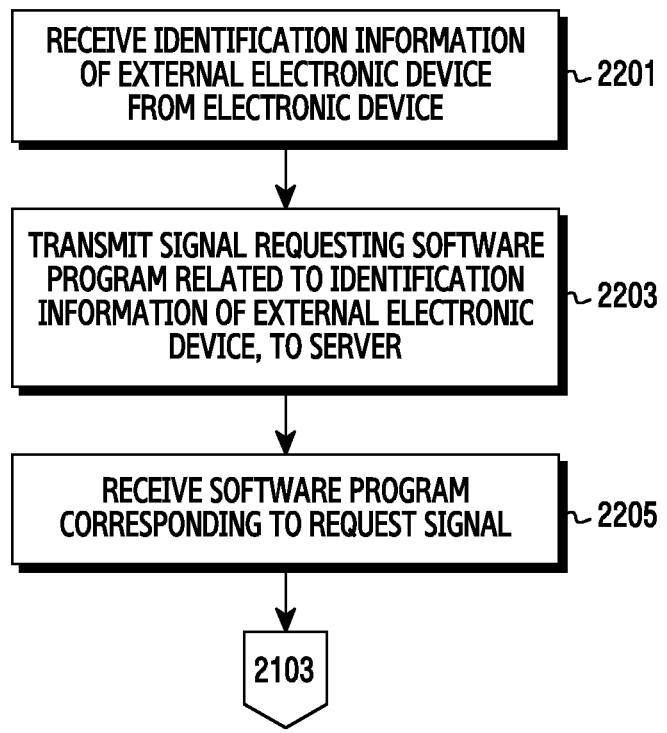
FIG. 22 is a flowchart illustrating another embodiment of a method of operating the IoT control device as part of the flowchart of FIG. 21.

FIG. 22 is a flowchart illustrating a method of receiving a software program for controlling an external device, according to one embodiment. Specifically, FIG. 22 provides more detailed operations of step 2101 of FIG. 21. Referring to FIG. 22, at operation 2201, an IoT control device (e.g., the control device 702 or the IoT control device 1010) may receive identification information of an IoT device (e.g., the smart electric light 1020) provided from an electronic device (e.g., the electronic device 700 or the mobile device 1000).

At operation 2203, the IoT control device may transmit a request signal for a software program related to the identification information of the IoT device, to a server (e.g., the server 464 or 1040). At operation 2205, in response to the request signal, the IoT control device may receive the software program related to the identification information of the IoT device, from the server. At operation 2103 of FIG. 21, the control device may install in the control device the software program used for control of the external electronic device received from the server.

Figure 23:
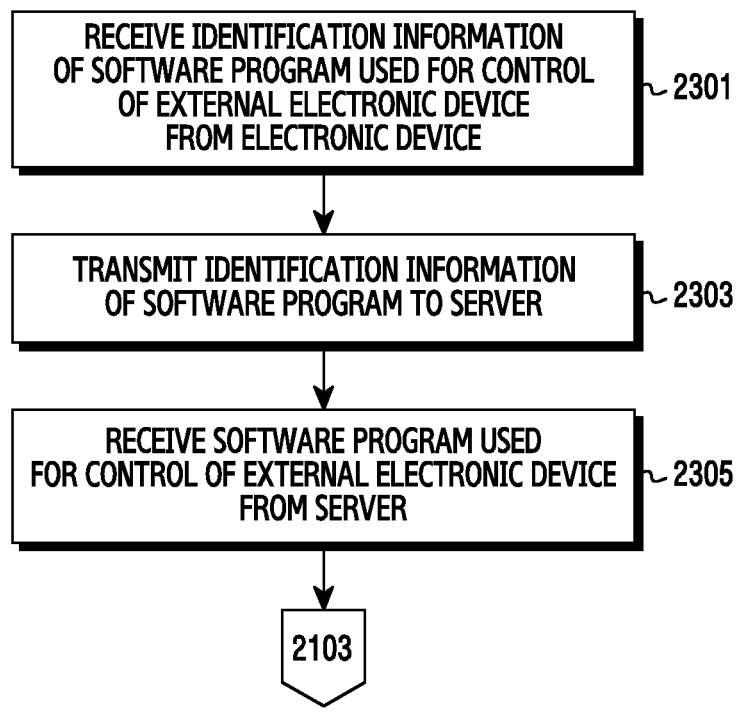
FIG. 23 is a flowchart illustrating another embodiment of a method of operating the IoT control device as part of the flowchart of FIG. 21.

FIG. 23 is a flowchart illustrating a method of receiving a software program for controlling an external device, according to one embodiment. Specifically, FIG. 23 provides more detailed operations of step 2101 of FIG. 21. Referring to FIG. 23, at operation 2301, an IoT control device (e.g., the control device 702 or the IoT control device 1010) may receive identification information of a software program related to an IoT device (e.g., a smart electric light 1020) provided from an electronic device (e.g., the electronic device 700 or the mobile device 1000).

At operation 2303, the IoT control device may transmit a request signal including the identification information of the used software program related to the IoT device, to a server (e.g., the server 464 or 1040). At operation 2305, in response to the request signal, the IoT control device may receive the software program related to the identification information of the IoT device, from the server. At operation 2103 of FIG. 21, the control device may install in the control device the software program used for control of the external electronic device received from the server.

In another embodiment, a mobile device may control an IoT device using a voice instruction. For example, when the mobile device receives the voice instruction, the mobile device may analyze the voice instruction (or selectively with the help of a separate server). The mobile device may transmit the analyzed voice instruction to an IoT control device. The IoT control device may transmit a control signal corresponding to the analyzed voice instruction, to the IoT device.

In one embodiment, upon receiving a voice instruction "turn off the light," the mobile device may analyze the corresponding voice instruction, based on a context such as the time and location of receiving the voice instruction. For example, the mobile device may analyze the voice instruction as an instruction for turning off the light installed in the room 1 of a house. The mobile device may transmit the analyzed voice instruction to an IoT control device. The IoT control device may transmit a control signal for "Turn off the light" to the light in the room 1 in accordance with the analyzed voice instruction. The light of the room 1 may then be turned off, based on the control signal.

In another embodiment, the moment or immediately after a mobile device and an IoT control device are connected to each other, the IoT (e.g., home control) may be activated. For example, when the mobile device is located within a service area of the IoT control device, a selected or specific operation or service related to a selected IoT device may be activated. For example, when a user with the mobile device arrives at home, the mobile device may be connected to an IoT control device through wireless connection (e.g., WiFi, BLE, Bluetooth and the like).

In one embodiment, when communication between an IoT control device and a mobile device is established, a specific operation or service related to the IoT device may be activated. For example, when the IoT control device detects that the mobile device is connected to the IoT control device, the IoT control device may transmit a control signal to a previously selected IoT device, controlling the IoT device to perform a selected operation.

In another embodiment, an IoT control device may selectively activate an operation or service (e.g. air conditioning) related to an IoT device, based on circumstances and/or context (e.g., a need based on, for example, environment, temperature, time, and illumination). In yet another embodiment, the IoT device and a specific operation or service associated therewith (e.g., turning on or off a light in room 2) may be selected in advance by a user.

In yet another embodiment, an IoT device may activate a specific operation, even without being wirelessly connected to the mobile device. For example, when a user with the mobile device drives a car toward home, the mobile device may provide its location information to an IoT control device. If it is determined that the mobile device comes within a selected distance from home, the IoT control device may start a specific operation of the IoT device (e.g., turn on an air conditioner).

In the above-described embodiments, an IoT device and an IoT control device can be efficiently and easily connected to each other, using a mobile device (serving as a user interface) and information on the IoT device.

Electronic devices and methods according to the embodiments described above may be used to easily connect various things to the Internet for implementing IoT environments. In addition, the electronic devices and methods can provide a system in which IoT devices can be controlled at a specific location or remotely, which is convenient to users.

While the present disclosure has been shown and described with reference to certain embodiments thereof, it will be understood by those skilled in the art that various changes in form and details may be made therein without departing from the spirit and scope of the present disclosure as defined by the appended claims and any equivalents thereof.

What is claimed is:
1. A system comprising:
a mobile device including:
   a first wireless communication interface;
   a camera;
   a display;
   a first non-volatile memory; and
   a first processor electrically connected to the first wireless communication interface, the camera, the display, and the first non-volatile memory; and
a media device including:
   a second wireless communication interface configured to support a Bluetooth® protocol;
   a third wireless communication interface configured to support a wireless fidelity (Wi-Fi) protocol;
   a second non-volatile memory;
   a wired communication port configured to transmit audio/video (AN) data to a television;
   a power connector configured to receive power supply; and
   a second processor electrically connected to the second wireless communication interface, the third wireless communication interface, the non-volatile second memory, the wired communication port, and the power connector,
   wherein the first non-volatile memory stores instructions that, when executed, cause the mobile device to:
   capture an image of a quick response (QR) code associated with an Internet-of-Things (IoT) device using the camera,
   obtain information from the image of the QR code,
   receive software codes corresponding to the obtained information from a server through the first wireless communication interface,
   transmit at least a first portion of the received software codes to the media device,
   provide, on the display, a user interface using at least a second portion of the software codes, the user interface being configured control the IoT device,
   receive a user input through the user interface provided on the display, and based on the user input, transmit a control signal to the media device, the control signal being used by the media device for remotely controlling the IoT device.

2. The system of claim 1, wherein the instructions further cause the mobile device to:
receive, through the first wireless communication interface, information on an application store that provides the software codes associated with the IoT device; and
display at least one image related to the software codes on the display based on the received information on the application store.

3. The system of claim 1, wherein the instructions further cause the mobile device to:
receive, through the first wireless communication interface, information on an application store that provides the software codes associated with the IoT device;
display at least one category related to the software codes on the display based on the received information on the application store; and
display a plurality of images including an image related to the software codes in response to a user input selecting one of the at least one displayed category.

4. The system of claim 1, wherein the at least a first portion of the software codes comprises at least one of identification information of the software codes and identification information of the IoT device.

5. The system of claim 1, wherein the instructions further cause the mobile device to: display a location of the IoT device on the display.

6. A mobile device comprising:
a wireless communication interface;
a camera;
a display;
a processor; and
a memory storing instructions that, when executed by the processor, cause the mobile device to:
capture an image of a quick response (QR) code associated with an Internet-of-Things (IoT) device using the camera,
obtain information from the image of the QR code,
receive software codes corresponding to the obtained information from a server through the wireless communication interface,
transmit at least a first portion of the software codes to an external device,
provide, on the display, a user interface using an at least a second portion of the software codes, the user interface being configured to control the IoT device,
receive a user input through the user interface provided on the display, and
based on the user input, transmit a control signal to the external device, the control signal being used by the external device for remotely controlling the IoT device.

7. The mobile device of claim 6, wherein the at least a first portion of the software codes comprises at least one of identification information of the software codes or identification information of the IoT device.

8. The mobile device of claim 6, wherein the instructions further cause the mobile device to display a location of the IoT device on the display.

9. The mobile device of claim 6, wherein the external device is configured to:
in response to receiving the control signal to control the IoT device via a wireless fidelity (Wi-Fi) communication interface, generate a signal for controlling the IoT device, independently of transmission of audio/video (A/V) data via a wired communication interface.

10. The mobile device of claim 6,
wherein the external device is configured to:
transmit, via a wired communication interface, audio/video (A/V) data to a connected display device,
receive the at least a first portion of the software codes from the mobile device, and
in response to the control signal to control the IoT device via the wireless communication interface, generate a signal for controlling the IoT device based on the at least a first portion of the software codes, independently of transmission of the A/V data via the wired communication interface.

11. A system comprising:
a mobile device including:
a first wireless communication interface;
a camera;
a touchscreen display;
a first non-volatile memory; and
a first processor electrically connected to the first wireless communication interface, the camera, the display, and the first non-volatile memory; and
a media device including:
a second wireless communication interface configured to support a Bluetooth®protocol;
a third wireless communication interface configured to support a wireless fidelity (Wi-Fi) protocol;
a second non-volatile memory;
a wired communication port configured to transmit audio/video (A/V) data to a television;
a power connector configured to receive power supply; and
a second processor electrically connected to the second wireless communication interface, the third wireless communication interface, the second non-volatile memory, the wired communication port, and the power connector,
wherein the first non-volatile memory stores instructions that, when executed, cause the first processor to:
scan a quick response (QR) code associated with an Internet-of-Things (IoT) device, using the camera,
access, through the first wireless communication interface, a server that stores a software program related to the IoT device, based on the scanned QR code;
receive at least a portion of the software program from the server, through the first wireless communication interface;
store, on the first non-volatile memory, the at least a portion of the software program received from the server;
transmit at least a first portion of the software program to the media device;
provide an image and text on the display, using at least a second portion of the software program;
receive a user input through the display; and
transmit a signal requesting to control the IoT device via the Internet to the media device, based on the user input, and
wherein the second non-volatile memory stores the at least a first portion of the software program including control software for controlling a plurality of different IoT devices, and instructions that, when executed, cause the second processor to:
independently of transmission of the AN data via the wired communication port, and in response to the signal requesting to control the IoT device via the third wireless communication interface, generate a signal for controlling the IoT device, using the control software; and transmit, to the IoT device, the signal for controlling the IoT device.

12. The system of claim 11, wherein the media device includes a fourth wireless communication interface configured to support one of a Bluetooth Low Energy protocol, a Zigbee® protocol, a power line communication protocol, an infrared transmission protocol, and an ultrasound communication protocol, and wherein the second non-volatile memory further stores instructions that, when executed, cause the second processor to transmit, to the IoT device, the signal for controlling the IoT device, using one of the second, third, and fourth wireless communication interface.

13. The system of claim 11, wherein the instructions further cause the mobile device to:

receive, through the first wireless communication interface, information on an application store that provides the software program associated with the IoT device; and display at least one image or icon related to the software program on the display, based on the received information on the application program store.

14. The system of claim 11, wherein the instructions further cause the mobile device to:

receive, through the first wireless communication interface, information on an application store that provides the software program associated with the IoT device;

display at least one category related to the software program on the display, based on the received information on the application store; and display a plurality of images or icons including an image or icon related to the software program, in response to a user input selecting the displayed category.

15. The system of claim 11, wherein the media device is configured to be connected to a personal cloud, and is further configured to use the television as a media device user interface.

16. A system comprising:
a mobile device including:
a first wireless communication interface;
a camera;
a touchscreen display;
a microphone;
a first non-volatile memory; and
a first processor electrically connected to the first wireless communication interface, the camera, the display, the microphone, and the first non-volatile memory; and
a media device connected to a personal cloud, and configured to be connected to a television and to use the television as a media device user interface,
wherein the media device includes:
a second wireless communication interface configured to support a Bluetooth® protocol;
a third wireless communication interface configured to support a wireless fidelity (Wi-Fi) protocol;
a second non-volatile memory;
a wired communication port configured to transmit audio/video (A/N) data to the television;
a power connector configured to receive power supply; and
a second processor electrically connected to the second wireless communication interface, the third wireless communication interface, the second non-volatile memory, the wired communication port, and the power connector, wherein the first non-volatile memory stores instructions that, when executed, cause the first processor to:

scan a quick response (QR) code on an Internet-of-Things (IoT) device or provided along with the IoT device, using the camera, access, through the first wireless communication interface, a server that stores a software program related to the IoT device, based on the scanned QR code;

receive at least a portion of the software program from the server, through the first wireless communication interface;

store, on the first non-volatile memory, the at least a portion of the software program received from the server;

transmit at least a first portion of the software program to the media device;

display an icon of an application program dedicated for controlling a plurality of IoT devices on the display;

receive an input for selecting the icon;

display a user interface including a list of IoT devices controllable by the mobile device on the display, wherein the list includes at least one image, and/or at least one text, using at least a second portion of the software program;

receive a user input through the display; and transmit a signal requesting to control the IoT device via the Internet to the media device, based on the user input, wherein the second non-volatile memory stores the at least a first portion of the software program including control software for controlling a plurality of different IoT devices, and instructions that, when executed, cause the second processor to:

receive information associated with the IoT device;

independently of transmission of the A/V data via the wired communication port, and in response to the signal requesting to control the IoT device via the third wireless communication interface, generate a signal for controlling the IoT device, using the control software; and transmit, to the IoT device, the signal for controlling the IoT device, using the Bluetooth® protocol or the Wi-Fi protocol.

17. The system of claim 16, wherein the first non-volatile memory further stores instructions that, when executed, cause the first processor to:

receive a user input selecting an application program associated with the IoT device from an application store; and download and install the application program on the mobile device.

18. The system of claim 17, wherein the IoT device includes a lighting system or a thermostat.

19. The system of claim 16, wherein the second non-volatile memory further stores instructions that, when executed, cause the second processor to:

exchange control signals for control and status check with the IoT device.

20. The system of claim 16, wherein the at least one image includes an icon representing the IoT device.

21. The system of claim 20, wherein the at least one image includes a location associated with the IoT device.

22. The system of claim 16, wherein the first non-volatile memory further stores instructions that, when executed, cause the mobile device to:
  receive a voice instruction via the microphone,
  analyze the voice instruction or send the voice instruction to a server, and
  cause the voice instruction to be transmitted via the media device to the IoT device.

23. The system of claim 16, wherein the first non-volatile memory further stores instructions that, when executed, cause the mobile device to:
  when the mobile device is located within a service area of the media device, activate a selected operation or service related to the IoT device.

24. The system of claim 23, wherein the first non-volatile memory further stores instructions that, when executed, cause the mobile device to:
  when the mobile device is connected with the media device via the Wi-Fi or Bluetooth protocol, activate a previously selected operation or service related to the IoT device.

25. The system of claim 24, wherein the first non-volatile memory further stores instructions that, when executed, cause the mobile device to:
  receive a selection of the operation in advance from a user.

* * * * *

UNITED STATES PATENT AND TRADEMARK OFFICE
CERTIFICATE OF CORRECTION

PATENT NO. : 11,409,509 B2  
APPLICATION NO. : 16/368185  
DATED : August 9, 2022  
INVENTOR(S) : Seokhyun Yoon Page 1 of 1

It is certified that error appears in the above-identified patent and that said Letters Patent is hereby corrected as shown below:

On the Title Page

Item (30) Please insert:  
--(30) Foreign Application Priority Data  
November 26, 2014 ............ KR ............... 10-2014-0166616--

Signed and Sealed this  
Thirteenth Day of September, 2022

Katherine Kelly Vidal  
*Director of the United States Patent and Trademark Office*